United States Patent
Suzuki et al.

(10) Patent No.: US 7,513,165 B2
(45) Date of Patent: Apr. 7, 2009

(54) METHOD FOR DETERMINING STRAIN HARDENING PROPERTY OF LINE PIPE

(75) Inventors: Nobuhisa Suzuki, Kanagawa (JP); Katsumi Masamura, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 422 days.

(21) Appl. No.: 10/581,403

(22) PCT Filed: Dec. 10, 2004

(86) PCT No.: PCT/JP2004/018858

§ 371 (c)(1),
(2), (4) Date: Jun. 1, 2006

(87) PCT Pub. No.: WO2005/057070

PCT Pub. Date: Jun. 23, 2005

(65) Prior Publication Data

US 2008/0276714 A1    Nov. 13, 2008

(51) Int. Cl.
*G01B 5/30* (2006.01)
(52) U.S. Cl. .................. 73/760; 73/78; 73/786
(58) Field of Classification Search ............ 73/760–856
See application file for complete search history.

(56) References Cited

U.S. PATENT DOCUMENTS

| 4,635,471 | A  | * | 1/1987  | Rogers et al. | 73/81  |
| 6,067,846 | A  | * | 5/2000  | Hill et al.   | 73/82  |
| 6,597,997 | B2 | * | 7/2003  | Tingley       | 702/34 |
| 7,277,162 | B2 | * | 10/2007 | Williams      | 356/32 |

FOREIGN PATENT DOCUMENTS

JP    8-109994 A    4/1996

* cited by examiner

*Primary Examiner*—Max Noori
(74) *Attorney, Agent, or Firm*—Frishauf, Holtz, Goodman & Chick, P.C.

(57) ABSTRACT

A method for determining a strain hardening property of a pipe enabling reduction of costs while ensuring pipeline integrity is provided. Moreover, a method for manufacturing a pipe based on the method for determining the strain hardening property of the pipe, a pipe manufactured by means of the method for manufacturing the pipe, and a pipeline are proposed. The method for determining the strain hardening property of the pipe according to the present invention includes a step of defining pipe dimensions where a diameter D, a thickness t, and a required critical local buckling strain $\epsilon_{req}$ of the pipe are set as conditions to be satisfied; a step of acquiring a strain hardening property for acquiring the strain hardening property in the vicinity of a buckling point of the pipe satisfying the conditions set in the step of defining the pipe dimensions; and a step of setting the strain hardening property as a condition to be satisfied by the stress-strain curve of the pipe.

15 Claims, 10 Drawing Sheets

METHOD FOR DETERMINING STRAIN HARDENING PROPERTY OF LINE PIPE

This application is the United States national phase application of International Application PCT/JP2004/018858 filed Dec. 10, 2004.

TECHNICAL FIELD

The present invention relates to methods for determining strain hardening properties of pipes that are used for gas and oil pipelines and the like, relates to methods for manufacturing pipes, relates to pipes, and relates to pipelines.

BACKGROUND ART

Gas pipelines and oil pipelines have been built as the basis of energy supply. Recently, many gas fields have been developed in places remote from consuming regions with increasing demand, particularly for natural gas, as the backdrop. Accordingly, pipelines have shown a tendency to be longer, and have developed an obvious tendency to have larger diameters and to be highly pressurized for mass transport.

FIG. 13 shows a flow chart of the process of pipeline construction focusing on the design of such pipelines. The conventional process of pipeline design is broadly classified into steps of (1) design of a pipeline system and (2) structural design of a pipeline. In designing the pipeline system, the type, diameter, thickness, and operating pressure of a pipe are temporally assumed such that an operating cost and a construction cost of a pipeline are minimized with consideration of transport volume and conveying distance that represent the scale of the project as prerequisites. In structural design of the pipeline, structural analysis is carried out with consideration of ground displacements and the like generated during earthquakes on the basis of a pipeline route, which is a pipeline shape to be constructed that is presumed from the strength and the dimensions of the pipe temporally set in the designing of the pipeline system and geographic features and the like of the places of construction; and then the maximum stress, the maximum strain, and local buckling are checked.

When the characteristics of the pipe temporally set in the designing of the pipeline system do not satisfy these check conditions, the process returns to the step of designing the pipeline system and the characteristics of the pipe are reset. When the characteristics of the pipe satisfy the above-described check conditions, the characteristics temporally set in the designing of the pipeline system are set as the specification of the pipe. The pipeline company then places an order with a steel company for the pipe, and the steel company manufactures the line pipe according to the specification given by the pipeline company.

In the local buckling check, it is checked whether the pipe with the conditions that have been temporally set in the designing of the pipeline system has sufficient local buckling performance to endure the maximum compressive strain and the maximum bending strain presumed under the conditions where the pipeline is constructed. Specifically, the critical local buckling strain of the pipe is obtained, and it is determined whether the critical local buckling strain is larger than the maximum strain generated in the pipeline or not.

Equation

The critical local buckling strain of the designed pipe is obtained as follows. In general, the critical local buckling strain of a pipe is represented by (critical local buckling strain)=coefficient·{(pipe thickness)/(pipe diameter)}$^{exponent}$. The coefficient and the exponent in the relation are obtained by plotting experimental data of local buckling with pipes as shown in FIG. 14, by drawing curves such that the lower bound of the experimental data are enveloped, and by fitting to these lower-bound envelope curves.

Table 1 shows proposed design equations of the critical local buckling strain acquired on the basis of the above-described local buckling experiments with real pipes.

TABLE 1

| Reference | Expression | S-S curve |
|---|---|---|
| Sherman (1976) | $\epsilon_{cr} = 16(t/D)^2$ | |
| Murphy and Langner (1985) | $\epsilon_{cr} = 0.5(t/D)$ | Continuous-hardening model |
| | $\epsilon_{cr} = 0.33(t/D)$ | Yield-plateau model |
| Gresnigt (1986) | $\epsilon_{cr} = 0.5(t/D) - 0.0025 + 3000(pD/2Et)^2$ | |
| Stephens Et al. (1991) | $\epsilon_{cr} = 2.42(t/D)^{1.59}$ | |

The proposed design equations of the critical local buckling strain shown in Table 1 prescribed by the current design standard are based on experimental data of pipes of grade X65 (grade of strength according to the API (American Petroleum Institute) standard in the United States) or lower. Therefore, the applicable scope in FIG. 13 is limited to line pipes of grade X65 or lower.

Besides those shown in Table 1, the following design equation of the critical local buckling strain is presented in "Guidelines for Anti-Seismic Design of High-Pressure Gas Pipelines (revised edition)" (issued by the Japan Gas Association, March 2000, page 39).

$\epsilon = 35(t/D)$ (%)

Since the design equations of the critical local buckling strain are acquired on the basis of the buckling experiments of pipes as described above, the critical local buckling strain is obtained on the basis of these estimate equations and it is determined whether the critical local buckling strain is larger than the maximum strain or not in the local buckling check. When the critical local buckling strain is smaller than the maximum strain, the process returns to the step of designing the pipeline system and the conditions are reset. In the resetting process at this time, the critical local buckling strain of the pipe is increased by increasing the pipe thicknesses on the basis of the relationship of (critical local buckling strain)= coefficient·{(pipe thickness)/(pipe diameter)}$^{exponent}$.

The above is a case for the line pipes of grade X65 or lower for which design equations of the critical local buckling strain have been acquired. When pipes of grade X70 or higher for which estimate equations of the critical local buckling strain have not yet been acquired are adopted for a pipeline, a sample pipe is produced by way of trials and errors, and the local buckling experiment is carried out such that the critical local buckling strain of the pipe is acquired as shown in FIG. 15. Then, it is determined whether the acquired critical local buckling strain of the pipe is larger than the maximum strain. When the critical local buckling strain is also smaller in this case, a sample pipe with a larger thickness is produced again and checked as in the case of a pipe of grade X65 or lower.

DISCLOSURE OF INVENTION

As described above, the local buckling is checked on the basis of the experimental equations in the conventional pipeline design. When the pipeline is determined to be unallowable in the check, the critical local buckling strain is increased by increasing the pipe thickness. This leads to the following problems.

(1) A Problem Occurring Due to the Local Buckling Check Carried Out on the Basis of Experimental Equations As described above, the design equations of the critical local buckling strain of the pipes of grade X65 or lower is represented by (critical local buckling strain)=coefficient·{(pipe thickness)/(pipe diameter)}$^{exponent}$ in the current design guidelines, design standards, and the like, and the coefficient and the exponent are values that are set so as to be on the safe side obtained in the buckling experiments. Moreover, as shown in Table 1 and FIG. 14, the experimental results and the equations based on these experimental results themselves vary widely.

In this manner, the design equations of the critical local buckling strain are based on such experimental results that vary widely and are moreover based on the experimental values that are set so as to be on the safe side. Therefore, when the local buckling is checked with the critical local buckling strain determined on the basis of such design equations, there is a high probability that a local buckling that is allowable in reality may not be determined to be allowable due to the too safe determination in some cases. In these cases, the local buckling that is supposed to be allowable is determined to be unallowable, and specifications on a safer side are required. This leads to an overdesigned system and cost overruns.

(2) A Problem Occurring Due to the Critical Local Buckling Strain being Increased by Increasing the Pipe Thickness Recent new pipelines have shown a tendency to be longer, and have developed a strong tendency to have larger diameters and to be highly pressurized for mass transport. These new pipelines have been required to have large diameters with small thicknesses and to be capable of enduring high internal pressures by applying high-strength steel pipes. The small pipe thicknesses can reduce welding costs in the field and transport costs of the pipes, and thus lead to a reduction in total costs of pipeline construction and pipeline operations.

Given this situation, high-strength pipes are required. However, steel pipes for pipelines are tend to have higher yield ratios (Y/T: the ratio of yield stress Y to tensile strength T) as the strength becomes higher.

On the other hand, when a premise is made that the pipe diameters and the pipe thicknesses are identical, the critical local buckling strains are apt to be reduced with higher strength of the pipes since the critical local buckling strains are reduced with higher yield ratios. Thus, the critical local buckling strains of the pipes need to be increased. However, the pipe thicknesses increased for satisfying this need run counter to the reduction in the total costs of the pipeline construction and the pipeline operations by means of the high-strength pipes with small thicknesses.

As described above, the local buckling is not appropriately checked and the critical local buckling strain is increased only by increasing the pipe thickness in the conventional pipeline design, resulting in cost overruns of the pipeline. Such a case is not unique to pipelines, and the same goes for building materials using steel pipes and the like.

The above is a case of the pipes of grade X65 or lower for which design equations of the critical local buckling strain have been acquired. For pipes of grade X70 or higher for which design equations of the critical local buckling strain have not been acquired, real pipes need to be produced by way of trial and error, and many hours are required. Moreover, since the pipe thickness is increased for improving the critical local buckling strain in the same manner, the same problem exists as in the case of the pipes of grade X65 or lower.

Furthermore, critical local buckling strain due to bending is required in addition to the critical local buckling strain by compression in the design of the pipeline. Although fundamental equations for the critical local buckling strain by compression have been acquired as above, fundamental equations for the critical local buckling strain due to bending have not yet been acquired. Accordingly, the equations need to be depend on experimental results of pipes as in the case of the above-described pipes of grade X70 or higher, and thus the same problem exists as in the case of the above-described pipes of grade X70 or higher.

The present invention is produced so as to solve the above-described problems, and aims to provide methods for determining strain hardening properties of pipes capable of reducing costs while ensuring safety.

Furthermore, the present invention aims to provide methods for manufacturing pipes using the methods for determining the strain hardening properties of the pipes, pipes manufactured by the methods for manufacturing the pipes, and pipelines.

In the conventional pipeline design, the critical local buckling strain is estimated in terms of the pipe diameter and the pipe thickness in the design of the pipeline system, and the pipe thickness is increased when the estimated value is smaller than the required value. However, in this method, the design equations themselves are experimental equations, and do not necessarily satisfy both the required economical efficiency and safety. Therefore, pipes that satisfy both the required economical efficiency and safety cannot be designed as long as the estimated value of the local buckling obtained by these estimate equations based on the experimental values is used as the reference.

Therefore, the inventors changed the approach where the required critical local buckling strain of a pipe is estimated by means of the pipe diameter and the pipe thickness determined in the design of the pipeline system to an approach where the stress-strain curve of the pipe is controlled such that the pipe diameter and the pipe thickness determined in the design of the pipeline system and the required critical local buckling strain also provided in advance are satisfied. Moreover, the inventors found that use of a new parameter that has not received any attention in the conventional designing of the pipeline structure is effective in this stress-strain curve control of the pipe. As a result of further investigation, the inventors found that strain hardening property of the pipe strongly affects the behavior of the local buckling of the pipe as the new parameter, and brought the present invention to completion. The strain hardening property is a parameter representing a degree of an increment in strain with respect to an increment in stress or a degree of an increment in stress with respect to an increment in strain; and is given, for example, as an inclination of a tangential line of a stress-strain curve at a critical local buckling point, or as a relationship of stress between multiple points including a combination of the critical local buckling point and an auxiliary point on the stress-strain curve.

(1) A method for determining a strain hardening property of a pipe according to the present invention includes a step of defining pipe dimensions where a diameter D, a thickness t, and a required critical local buckling strain $\epsilon_{req}$ of the pipe are set as conditions to be satisfied; a step of acquiring a strain hardening property for acquiring the strain hardening property in the vicinity of a buckling point of the pipe satisfying the conditions set in the step of defining the pipe dimensions; and a step of setting the strain hardening property as a condition to be satisfied by the stress-strain curve of the pipe.

It is intended that the phrase "in the vicinity of a buckling point" includes a partial relationship of stress between multiple points acquired by means of a tentative buckling point and an auxiliary point provided in the vicinity of the critical load buckling point for calculating a tangent modulus $E_{Tcr}$ in the "strain hardening property" herein as described below.

(2) Moreover, a method for determining a strain hardening property of a pipe according to the present invention includes a step of defining pipe dimensions where a diameter D, a thickness t, and a transport pressure of the pipe used for a pipeline are temporally set on the basis of at least transport volume and conveying distance of pressurized fluid transported by the pipeline; a step of calculating the maximum axial compressive strain where the structure of the pipeline is designed with consideration of the pipeline route with the pipe having the diameter and the thickness that have been temporally set, and where the maximum axial compressive strain generated in the pipe when the transport pressure, ground displacement and/or an external force are exerted on the designed pipeline is determined; a step of defining a required critical local buckling strain for defining the required critical local buckling strain $\epsilon_{req}$ on the basis of the maximum axial compressive strain; a step of acquiring a strain hardening property for acquiring the strain hardening property in the vicinity of a buckling point of the pipe satisfying all the conditions of the diameter D, the thickness t, and the required critical local buckling strain $\epsilon_{req}$; and a step of setting the strain hardening property as a condition to be satisfied by the stress-strain curve of the pipe.

When the pipeline is deformed by bending moment, safety against the local buckling due to bending needs to be added to the pipeline. However, there is no analytic solution for calculating the critical local buckling strain due to bending. Therefore, a relationship (ratio) between the critical local buckling strain due to compression and the critical local buckling strain due to bending is quantitatively determined by, for example, an finite element analysis, and the required critical local buckling strain due to bending is converted into the required critical local buckling strain due to compression by means of the quantitative ratio. Then, by means of the above-described step on the basis of this required critical local buckling strain due to compression, the stress-strain curve of the pipe can be controlled when the pipeline is deformed by bending moment as below. FIG. 7 shows a graph of the critical local buckling strain due to compression and the critical local buckling strain due to bending acquired by the finite element analysis and plotted on the same coordinates. In this example, analysis was carried out when the ratios D/t of the pipe diameter D to the pipe thickness t were 50 and 60 and the yield ratios (Y/T; the ratio of the yield stress Y to the tensile strength T) were 0.80, 0.85, 0.90, and 0.93. As shown in FIG. 7, the ratio of the critical local buckling strain by compression to the critical local buckling strain by bending is 1 to 2 when evaluated so as to be on the safe side.

(3) A method for determining a strain hardening property of a pipe when a pipeline is deformed by bending moment according to the present invention includes a step of defining pipe dimensions where a diameter D, a thickness t, and a required critical local buckling strain due to bending of the pipe are set as conditions to be satisfied; a step of converting critical local buckling strain where the required critical local buckling strain due to bending is converted into the required critical local buckling strain $\epsilon_{req}$ due to compression with a quantitative relationship between the critical local buckling strain due to bending and the critical local buckling strain due to compression; a step of acquiring a strain hardening property for acquiring the strain hardening property in the vicinity of a buckling point of the pipe satisfying all the conditions of the diameter D, the thickness t, and the required critical local buckling strain $\epsilon_{req}$ due to compression; and a step of setting the strain hardening property as a condition to be satisfied by the stress-strain curve of the pipe.

(4) Moreover, a method for determining a strain hardening property of a pipe according to the present invention includes a step of defining pipe dimensions where a diameter D, a thickness t, and a transport pressure of the pipe used for a pipeline are temporally set on the basis of at least transport volume and conveying distance of pressurized fluid transported by the pipeline; a step of calculating the maximum bending strain where the structure of the pipeline is designed with consideration of the pipeline route with the pipe having the diameter and the thickness that have been temporally set, and where the maximum bending strain generated in the pipe when the transport pressure, ground displacement and/or an external force are exerted on the designed pipeline is determined; a step of converting critical local buckling strain where the required critical local buckling strain by bending is set on the basis of the maximum bending strain, and then the required critical local buckling strain by bending is converted into the required critical local buckling strain $\epsilon_{req}$ by compression with a quantitative relationship between the critical local buckling strain due to bending and the critical local buckling strain due to compression; a step of acquiring a strain hardening property for acquiring the strain hardening property in the vicinity of a buckling point of the pipe satisfying all the conditions of the diameter D, the thickness t, and the required critical local buckling strain $\epsilon_{req}$ due to compression; and a step of setting the strain hardening property as a condition to be satisfied by the stress-strain curve of the pipe.

(5) Furthermore, the strain hardening property according to (1) to (4) is given with respect to the inclination of a tangential line on the stress-strain curve at a tentative buckling point, the tentative buckling point corresponding to the required critical local buckling strain $\epsilon_{req}$ being supposed to be on the stress-strain coordinates.

(6) Moreover, when the strain hardening property and the tangential line according to (5) are defined as H and $E_{Treq}$, respectively, the strain hardening property H satisfies the following equation.

$$H = \frac{E_{Treq}}{\sigma_{req}} \geq \frac{9}{16} \varepsilon_{req} \left(\frac{D}{t}\right)^2 \quad (1.1)$$

where $\sigma_{req}$ is a stress of a point on the stress-strain curve corresponding to $\epsilon_{req}$.

Equation (1.1) in (6) will now be described.

Equation (1.2) described below can be cited as a fundamental equation representing critical buckling strain of a pipe subjected to compressive force.

$$\varepsilon_{cr} = \frac{2}{\sqrt{3(1-v^2)}} \sqrt{\frac{E_{Tcr}}{E_{Scr}}} \frac{t}{d} \quad (1.2)$$

In Equation (1.2), $\epsilon_{cr}$, $v$, t, and D denote the critical local buckling strain, Poisson's ratio, the thickness of the pipe, and the diameter of the pipe, respectively. Moreover, $E_{scr}$ denotes an inclination of a line produced by connecting the origin and the buckling point (referred to as "secant modulus" hereafter), and $E_{Tcr}$ denotes the inclination of the stress-strain curve at the buckling point (referred to as "tangent modulus" hereafter) in FIG. 8 illustrating the stress-strain curve of a continuous-hardening type.

In Equation (1.2), substitution of 0.5 into Poisson's ratio ν for plastic deformation and rearrangement of the terms lead to the following Equation (1.3).

$$\varepsilon_{cr} = \frac{4}{3}\sqrt{\frac{E_{Tcr}}{E_{Scr}}}\frac{t}{D} \tag{1.3}$$

When both sides of Equation (1.3) are multiplied by themselves and solved for $E_{Tcr}$, the following Equation (1.4) is obtained.

$$E_{Tcr} = \frac{9}{16}E_{Scr}\varepsilon_{cr}^2\left(\frac{D}{t}\right)^2 \tag{1.4}$$

Moreover, when the stress corresponding to $\varepsilon_{cr}$ on the stress-strain curve is defined as $\sigma_{cr}$, Equation (1.4) can be represented as the following equation since $E_{scr}$ is equal to $\sigma_{cr}$ divided by $\varepsilon_{cr}$ (see FIG. 8).

$$E_{Tcr} = \frac{9}{16}\sigma_{cr}\varepsilon_{cr}\left(\frac{D}{t}\right)^2 \tag{1.5}$$

Since the value of the required critical local buckling strain input as a required value is higher than or equal to the critical local buckling strain $\varepsilon_{cr}$, the required critical local buckling strain is expressed as $\varepsilon_{req}$ so as to be distinguishable from the critical local buckling strain $\varepsilon_{cr}$. Moreover, when the required critical local buckling strain $\varepsilon_{req}$ is used, the acquired tangent modulus is the minimum value that satisfies the required conditions. Therefore, when these conditions are taken into consideration for Equation (1.5), $E_{Treq}$ as a condition to be satisfied by the stress-strain curve is represented as the following Equation (1.6).

$$E_{Treq} \geq \frac{9}{16}\sigma_{req}\varepsilon_{req}\left(\frac{D}{t}\right)^2 \tag{1.6}$$

In Equation (1.6), $\sigma_{req}$ is a stress of a point corresponding to $\varepsilon_{req}$ on the stress-strain curve. The right side of Equation (1.6) includes $\sigma_{req}$ serving as a dependent variable of $\varepsilon_{req}$. Therefore, when the right side is arranged as a function of the values that are temporally set and the required value, and the dependent variable $\sigma_{req}$ and a tangent modulus $E_{Treq}$ serving as a required value are disposed in the left side; Equation (1.7), which is shown in (6), is obtained.

$$H = \frac{E_{Treq}}{\sigma_{req}} \geq \frac{9}{16}\varepsilon_{req}\left(\frac{D}{t}\right)^2 \tag{1.7}$$

In the description above, the constant in Equation (1.3) was 4/3 due to the substitution of 0.5 into Poisson's ratio ν in Equation (1.2), but a numerical value other than 0.5 may be substituted into Poisson's ratio ν according to various situations. In that case, the constant 4/3 in Equation (1.3) varies.

Therefore, Equation (1.3) can be represented as the following Equation (1.8) in general by defining the constant as A. Similarly, the constant 9/16 in Equation (1.7) and Equations (2.1), (4.1), and (5.9) described below can be replaced with $1/A^2$, and the constant 9/32 in Equation (3.9) can be replaced with $1/(2A^2)$.

$$\varepsilon_{cr} = A\sqrt{\frac{E_{Tcr}}{E_{Scr}}}\frac{t}{D} \tag{1.8}$$

(7) Another method for determining a strain hardening property of a pipe according to the present invention is characterized in that the strain hardening property according to (1) to (4) is given as a partial relationship of stress between multiple points by means of a tentative buckling point and one or more auxiliary points when it is hypothesized that the tentative buckling point corresponding to the required critical local buckling strain $\varepsilon_{req}$ is disposed on the stress-strain coordinates and the one or more auxiliary points are disposed at positions on the stress-strain coordinates, the strain values of the auxiliary points being remote from that of the tentative buckling point.

Since the strain hardening property is given as the partial relationship between the multiple points, the determination, for example, of whether a pipe manufactured by an existing manufacturing method satisfies the required strain hardening property can be facilitated. That is to say, since the stress-strain relationship of the pipe manufactured by the existing manufacturing method is given as a point sequence, the required strain hardening property provided as the partial relationship of stress between the multiple points facilitates the comparison with the existing data, and thus the determination can easily be performed.

(8) Moreover, the partial relationship of stress between the multiple points according to (7) satisfies the following equation.

$$H = \frac{\sigma_2}{\sigma_{req}} \geq 1 + \frac{9}{16}\varepsilon_{req}(\varepsilon_2 - \varepsilon_{req})\left(\frac{D}{t}\right)^2 \tag{2.1}$$

where $\varepsilon_{req}$: required critical local buckling strain;

$\sigma_{req}$: stress of a point corresponding to $\varepsilon_{req}$ on the stress-strain curve;

$\varepsilon_2$: strain at an auxiliary point 2; and $\sigma_2$: stress of a point corresponding to $\varepsilon_2$ on the stress-strain curve (stress at the auxiliary point 2).

Equation (2.1) in (8) will now be described.

An assumed stress-strain curve of a round-house type is shown in FIG. 9. The horizontal axis in FIG. 9 represents axial compressive strain of a pipe, and the vertical axis represents axial compressive stress. $\varepsilon_{cr}$ on the horizontal axis denotes the critical local buckling strain, and $\varepsilon_2$ denotes the strain at the auxiliary point 2 that is set at the right side of $\varepsilon_{cr}$ at an arbitrary interval. The points on the stress-strain curve corresponding to $\varepsilon_{cr}$ and $\varepsilon_2$ on the horizontal axis are referred to as the buckling point C and the auxiliary point 2, respectively. The stresses at the buckling point C and the auxiliary point 2 are expressed as $\sigma_{cr}$ and $\sigma_2$, respectively. The secant modulus $E_{Scr}$ is expressed by an incline of a line segment connecting the origin of the coordinates and the buckling point C. When it is hypothesized that the relationship of stress between the buckling point C and the auxiliary point 2 is linear, the tangent modulus and the secant modulus are expressed as follows.

$$E_{Tcr} = \frac{\sigma_2 - \sigma_{cr}}{\varepsilon_2 - \varepsilon_{cr}} \quad (2.2)$$

$$E_{Scr} = \frac{\sigma_{cr}}{\varepsilon_{cr}} \quad (2.3)$$

As described above, the critical local buckling strain of the pipe is given by the following Equation (2.4).

$$\varepsilon_{cr} = \frac{4}{3} \sqrt{\frac{E_{Tcr}}{E_{Scr}}} \frac{t}{D} \quad (2.4)$$

Substitution of Equations (2.2) and (2.3) into Equation (2.4) and rearrangement of the terms lead to the following Equation (2.5).

$$\varepsilon_{cr} = \frac{16}{9\sigma_{cr}} \frac{\sigma_2 - \sigma_{cr}}{\varepsilon_2 - \varepsilon_{cr}} \left(\frac{t}{D}\right)^2 \quad (2.5)$$

As in the case for (6), the required critical local buckling strain input as the required value is expressed as $\varepsilon_{req}$ so as to be distinguishable from the critical local buckling strain $\varepsilon_{cr}$. Moreover, when the stress on the stress-strain curve corresponding to the required critical local buckling strain $\varepsilon_{req}$ is defined as $\sigma_{req}$, and the right side of Equation (2.5) is arranged as a function of the values that are temporally set and the required value, the following Equation (2.6) is obtained.

$$\frac{\sigma_2}{\sigma_{req}} = 1 + \frac{9}{16} \varepsilon_{req} (\varepsilon_2 - \varepsilon_{req}) \left(\frac{D}{t}\right)^2 \quad (2.6)$$

Since Equation (2.6) indicates the minimum value, the partial relationship of stress between the multiple points serving as the condition to be satisfied by the stress-strain diagram of the pipe finally becomes the following Equation (2.7), which is identical to the above-described Equation (2.1).

$$H = \frac{\sigma_2}{\sigma_{req}} \geq 1 + \frac{9}{16} \varepsilon_{req} (\varepsilon_2 - \varepsilon_{req}) \left(\frac{D}{t}\right)^2 \quad (2.7)$$

(9) Moreover, another method for determining a strain hardening property of a pipe according to the present invention is characterized in that the partial relationship of stress between the multiple points according to (7) satisfies the following Equation (3.1).

$$H = \frac{2\sigma_{req} + (\sigma_2 - \sigma_1)}{2\sigma_{req}} \geq \left\{1 + \frac{9}{32} (\varepsilon_2 - \varepsilon_1) \varepsilon_{req} \left(\frac{D}{t}\right)^2\right\} \quad (3.1)$$

where $\varepsilon_1, \varepsilon_2$: strains at auxiliary points 1 and 2, respectively, with the buckling point interposed therebetween;

$\sigma_{req}$: stress of the buckling point corresponding to $\varepsilon_{req}$ on the stress-strain curve; and $\sigma_1, \sigma_2$: stresses of points corresponding to $\varepsilon_1$ and $\varepsilon_2$, respectively, on the stress-strain curve (stresses at the auxiliary points 1 and 2, respectively).

Equation (3.1) in (9) will now be described.

An assumed stress-strain curve of a round-house type is shown in FIG. 10. The horizontal axis in FIG. 10 represents axial compressive strain of a pipe, and the vertical axis represents axial compressive stress. $\varepsilon_{cr}$ on the horizontal axis denotes the critical local buckling strain, and $\varepsilon_1$ and $\varepsilon_2$ denote the strains at the auxiliary points 1 and 2 that are set at both sides of $\varepsilon_{cr}$ at an arbitrary interval. The spacing between $\varepsilon_{cr}$ and $\varepsilon_1$ and the spacing between $\varepsilon_{cr}$ and $\varepsilon_2$ are identical.

The points on the stress-strain curve corresponding to $\varepsilon_{cr}$, $\varepsilon_1$ and $\varepsilon_2$ on the horizontal axis are referred to as the buckling point C, the auxiliary point 1, and the auxiliary point 2, respectively. The stresses at the buckling point C, the auxiliary point 1, and the auxiliary point 2 are expressed as $\sigma_{cr}$, $\sigma_1$, and $\sigma_2$, respectively. Moreover, a point A is a midpoint between the point 1 and the point C, and a point B is a midpoint between the point C and the point 2. Strains on the horizontal axis corresponding to the points A and B are expressed as $\varepsilon_A$ and $\varepsilon_B$, respectively, and the values are the mean values of $\varepsilon_1$ and $\varepsilon_{cr}$, and $\varepsilon_{cr}$ and $\varepsilon_2$, respectively. Stresses on the vertical axis corresponding to $\varepsilon_A$ and $\varepsilon_B$ are $\sigma_A$ and $\sigma_B$, respectively. The relationships of these can be represented by the following Equations (3.2) to (3.5).

$$\sigma_A = \frac{1}{2}(\sigma_1 + \sigma_{cr}) \quad (3.2)$$

$$\sigma_B = \frac{1}{2}(\sigma_{cr} + \sigma_2) \quad (3.3)$$

$$\varepsilon_A = \frac{1}{2}(\varepsilon_1 + \varepsilon_{cr}) \quad (3.4)$$

$$\varepsilon_B = \frac{1}{2}(\varepsilon_{cr} + \varepsilon_2) \quad (3.5)$$

The tangent modulus $E_{Tcr}$ and the secant modulus $E_{Scr}$ at the buckling point (point C) are represented by the following equations.

$$E_{Tcr} = \frac{\sigma_B - \sigma_A}{\varepsilon_B - \varepsilon_A} = \frac{\sigma_2 - \sigma_1}{\varepsilon_2 - \varepsilon_1} \quad (3.6)$$

$$E_{Scr} = \frac{\sigma_{cr}}{\varepsilon_{cr}} \quad (3.7)$$

Substitution of Equations (3.6) and (3.7) into Equation (1.2), both sides of Equation (1.2) being multiplied by themselves, and rearrangement of the terms lead to the following Equation (3.8).

$$\frac{2\sigma_{cr} + (\sigma_2 - \sigma_1)}{2\sigma_{cr}} = 1 + \frac{9}{32}(\varepsilon_2 - \varepsilon_1)\varepsilon_{cr}\left(\frac{D}{t}\right)^2 \quad (3.8)$$

As in the case for (6), the required critical local buckling strain input as the required value is expressed as $\varepsilon_{req}$ so as to be distinguishable from the critical local buckling strain $\varepsilon_{cr}$. Moreover, the stress on the stress-strain curve corresponding to the required critical local buckling strain $\varepsilon_{req}$ is defined as $\sigma_{req}$. Since Equation (3.8) indicates the minimum value, the partial relationship of stress between the multiple points to be satisfied by the stress-strain curve of the pipe finally becomes the following Equation (3.9), which is identical to the above-described Equation (3.1).

$$H = \frac{2\sigma_{req} + (\sigma_2 - \sigma_1)}{2\sigma_{req}} \geq 1 + \frac{9}{32}(\varepsilon_2 - \varepsilon_1)\varepsilon_{req}\left(\frac{D}{t}\right)^2 \quad (3.9)$$

(10) Moreover, another method for determining a strain hardening property of a pipe according to the present invention is characterized in that the partial relationship of stress between the multiple points according to (7) satisfies the following Equation (4.1).

$$H = \frac{\sigma_2}{\sigma_{req}} \geq \left\{1 + \frac{9}{16}\log_e\left(\frac{\varepsilon_2}{\varepsilon_{req}}\right)\varepsilon_{req}^2\left(\frac{D}{t}\right)^2\right\} \quad (4.1)$$

where
$\varepsilon_{req}$: required critical local buckling strain;
$\sigma_{req}$: stress of the buckling point corresponding to $\varepsilon_{req}$ on the stress-strain curve;
$\varepsilon_2$: strain at an auxiliary point 2; and
$\sigma_2$: stress of a point corresponding to $\varepsilon_2$ on the stress-strain curve (stress at the auxiliary point 2).

Equation (4.1) will now be described.

The entire stress-strain curve represented by a single n-power function is the following Equation (4.2).

$$\sigma = A\varepsilon^n \quad (4.2)$$

where $\sigma$, $\varepsilon$, A, and n indicate a stress, a strain, a coefficient, and a strain hardening exponent, respectively.

When the stress-strain relationship of the pipe is represented by Equation (4.2) according to an n-power hardening rule, a tangent modulus $E_T$ and a secant modulus $E_S$ are represented as follows.

$$\sigma = A\varepsilon^n \quad (4.3)$$

$$E_T = \frac{d\sigma}{d\varepsilon} = An\varepsilon^{n-1} \quad (4.4)$$

$$E_S = \frac{\sigma}{\varepsilon} = \frac{A\varepsilon^n}{\varepsilon} = A\varepsilon^{n-1} \quad (4.5)$$

Therefore, the radicals of the fundamental equation (1.3) representing the critical buckling strain of the pipe is represented as the following equation.

$$\sqrt{\frac{E_T}{E_S}} = \sqrt{\frac{An\varepsilon^{n-1}}{A\varepsilon^{n-1}}} = \sqrt{n} \quad (4.6)$$

When Equation (4.6) is substituted into Equation (1.2), the critical buckling strain is represented as the following equation.

$$\varepsilon_{cr} = \frac{4}{3}\sqrt{\frac{E_{Tcr}}{E_{Scr}}}\frac{t}{D} = \frac{4}{3}\sqrt{n}\frac{t}{D} \quad (4.7)$$

When the stress-strain relationship represented by Equation (4.2) described above is plotted on double logarithmic axes and $\varepsilon_2$ (auxiliary point 2) is provided at the right side of the point $\varepsilon_{cr}$ as shown in FIG. 11, the strain hardening exponent n can be calculated with the following equation.

$$n_{cr} = \frac{\log\sigma_2 - \log\sigma_{cr}}{\log\varepsilon_2 - \log\varepsilon_{cr}} = \frac{\log(\sigma_2/\sigma_{cr})}{\log(\varepsilon_2/\varepsilon_{cr})} \quad (4.8)$$

The stress-strain relationship is a monotonically increasing function. For local buckling in a plastic region considered in this specification, the relationship of stress between two points in the numerator of the right side of the equation above is represented as the following Equation (4.9).

$$1.0 \leq \frac{\sigma_2}{\sigma_{cr}} \approx 1.0 \quad (4.9)$$

Moreover, in a logarithmic function, a positive number x having a minute amount close to zero approximates to the following Equation (4.10).

$$\log(1 + x) \cong x \quad (4.10)$$

Therefore, the numerator of the right side of Equation (4.8) approximates to the following equation.

$$\log\frac{\sigma_2}{\sigma_{cr}} = \log\left(1 + \left(\frac{\sigma_2}{\sigma_{cr}} - 1\right)\right) \cong \frac{\sigma_2}{\sigma_{cr}} - 1 \quad (4.11)$$

Substitution of Equation (4.11) into Equation (4.8) leads to:

$$n_{cr} \cong \frac{1}{\log(\varepsilon_2/\varepsilon_{cr})}\left(\frac{\sigma_2}{\sigma_{cr}} - 1\right) \quad (4.12)$$

When the equation above is substituted into Equation (4.7) and both sides thereof are multiplied by themselves, the following equation is obtained.

$$\varepsilon_{cr}^2 = \frac{16}{9}n_{cr}\left(\frac{t}{D}\right)^2 = \frac{16}{9}\frac{1}{\log(\varepsilon_2/\varepsilon_{cr})}\left(\frac{\sigma_2}{\sigma_{cr}} - 1\right)\left(\frac{t}{D}\right)^2 \quad (4.13)$$

Further rearrangement of the equation leads to:

$$\frac{\sigma_2}{\sigma_{cr}} = 1 + \frac{16}{9}\log\left(\frac{\varepsilon_2}{\varepsilon_{cr}}\right)\varepsilon_{cr}^2\left(\frac{D}{t}\right)^2 \quad (4.14)$$

As in the case for (6), the required critical local buckling strain input as the required value is expressed as $\varepsilon_{req}$ so as to be distinguishable from the critical local buckling strain $\varepsilon_{cr}$. Moreover, the stress on the stress-strain curve corresponding to the required critical local buckling strain $\varepsilon_{req}$ is defined as $\sigma_{req}$. Since Equation (4.14) indicates the minimum value, the partial relationship of stress between the multiple points to be satisfied by the stress-strain curve of the pipe finally becomes the following Equation (4.15), which is identical to the above-described Equation (4.1).

$$H = \frac{\sigma_2}{\sigma_{req}} \geq 1 + \frac{16}{9}\log\left(\frac{\varepsilon_2}{\varepsilon_{req}}\right)\varepsilon_{req}^2\left(\frac{D}{t}\right)^2 \quad (4.15)$$

(11) Moreover, another method for determining a strain hardening property of a pipe according to the present invention is characterized in that the partial relationship of stress between the multiple points according to (7) satisfies the following Equation (5.1).

$$\frac{\sigma_2 + \sigma_{req}}{\sigma_1 + \sigma_{req}} \geq \left\{1 + \frac{9}{16}\log_e\left(\frac{\varepsilon_2 + \varepsilon_{req}}{\varepsilon_1 + \varepsilon_{req}}\right)\varepsilon_{req}^2\left(\frac{D}{t}\right)^2\right\} \quad (5.1)$$

where $\varepsilon_1, \varepsilon_2$: strains at auxiliary points 1 and 2, respectively, with the buckling point interposed therebetween;

$\sigma_{req}$: stress of a point corresponding to $\varepsilon_{req}$ on the stress-strain curve; and $\sigma_1, \sigma_2$: stresses of points corresponding to $\varepsilon_1$ and $\varepsilon_2$, respectively, on the stress-strain curve (stresses at the auxiliary points 1 and 2, respectively).

Equation (5.1) in (11) will now be described.

An assumed stress-strain curve of a round-bouse type is shown in FIG. 12. The horizontal axis in FIG. 12 represents axial compressive strain of a pipe, and the vertical axis represents axial compressive stress.

When points and stresses on the stress-strain curve corresponding to $\varepsilon_{cr}$, $\varepsilon_1$, and $\varepsilon_2$ on the horizontal axis (on the strain axis) are defined as the buckling point C ($\sigma_{cr}$), the auxiliary point 1 ($\sigma_1$), and the auxiliary point 2 ($\sigma_2$), respectively, also for the stress-strain relationship expressed by an n-power function as in the case where the relationship is linear, the following equations are obtained.

$$\sigma_A = \frac{1}{2}(\sigma_1 + \sigma_{cr}) \quad (5.2)$$

$$\sigma_B = \frac{1}{2}(\sigma_{cr} + \sigma_2) \quad (5.3)$$

$$\varepsilon_A = \frac{1}{2}(\varepsilon_1 + \varepsilon_{cr}) \quad (5.4)$$

$$\varepsilon_B = \frac{1}{2}(\varepsilon_{cr} + \varepsilon_2) \quad (5.5)$$

The strain hardening exponent is represented by the following equation by adopting an approximate equation as in the case where the two points are shown.

$$\begin{aligned} n_{cr} &= \frac{\log(\sigma_B/\sigma_A)}{\log(\varepsilon_B/\varepsilon_A)} \\ &\equiv \left(\frac{\sigma_B}{\sigma_A} - 1\right)\frac{1}{\log(\varepsilon_B/\varepsilon_A)} \\ &= \frac{(\sigma_{cr} + \sigma_2)/(\sigma_1 + \sigma_{cr}) - 1}{\log\{(\varepsilon_{cr} + \varepsilon_2)/(\varepsilon_1 + \varepsilon_{cr})\}} \end{aligned} \quad (5.6)$$

When the Equation (5.6) is substituted into Equation (4.7) and both sides thereof are multiplied by themselves, the following equation is obtained.

$$\varepsilon_{cr}^2 = \frac{16}{9}n_{cr}\left(\frac{t}{D}\right)^2 = \frac{16}{9}\frac{(\sigma_{cr} + \sigma_2)/(\sigma_1 + \sigma_{cr}) - 1}{\log\{(\varepsilon_{cr} + \varepsilon_2)/(\varepsilon_1 + \varepsilon_{cr})\}}\left(\frac{t}{D}\right)^2 \quad (5.7)$$

Further rearrangement of the equation leads to the following equation.

$$\frac{\sigma_{cr} + \sigma_2}{\sigma_1 + \sigma_{cr}} = 1 + \frac{9}{16}\log\left(\frac{\varepsilon_{cr} + \varepsilon_2}{\varepsilon_1 + \varepsilon_{cr}}\right)\varepsilon_{cr}^2\left(\frac{D}{t}\right)^2 \quad (5.8)$$

As in the case for (6), the required critical local buckling strain input as the required value is expressed as $\varepsilon_{req}$ so as to be distinguishable from the critical local buckling strain $\varepsilon_{cr}$. Moreover, the stress on the stress-strain curve corresponding to the required critical local buckling strain $\varepsilon_{req}$ is defined as $\sigma_{req}$. Since Equation (5.8) indicates the minimum value, the partial relationship of stress between the multiple points to be satisfied by the stress-strain curve of the pipe finally becomes the following Equation (5.9), which is identical to the above-described Equation (5.1).

$$H = \frac{\sigma_{req} + \sigma_2}{\sigma_1 + \sigma_{req}} \geq 1 + \frac{9}{16}\log\left(\frac{\varepsilon_{req} + \varepsilon_2}{\varepsilon_1 + \varepsilon_{req}}\right)\varepsilon_{req}^2\left(\frac{D}{t}\right)^2 \quad (5.9)$$

(12) Moreover, another method for determining a strain hardening property of a pipe according to the present invention is characterized in that a yield-stress range and a tensile-stress range determined by the standards or the required conditions of materials in addition to the strain hardening property are set as conditions to be satisfied by the stress-strain curve of the pipe according to (1) to (11).

The yield-stress range and the tensile-stress range set as the conditions in this manner facilitate selection of pipes when pipes that satisfy design conditions are selected from those manufactured by existing manufacturing methods since the pipes can be narrowed down by the yield-stress range and the tensile-stress range before considering the strain hardening property. Moreover, when new pipes are manufactured on the basis of the stress-strain curve control, manufacturing methods can be narrowed down by setting the yield-stress range and the tensile-stress range as the conditions.

(13) Moreover, the method for determining the strain hardening property according to (1) to (12) further includes a determination step for determining whether the pipe having mechanical properties indicated by the stress-strain curve that satisfies a condition can be manufactured when the strain hardening property acquired in the step of acquiring the strain hardening property is set as the condition of the stress-strain curve of the pipe to be satisfied; and is characterized in that the pipe diameter and the pipe thickness that are set or temporally set are adopted when it is determined to be manufacturable in the determination step, and the process returns to the step of defining the pipe dimensions and restarts when it is determined to be unmanufacturable.

(14) Moreover, the determination step according to (13) includes a determination when pipes are manufactured by an existing manufacturing method and a determination when pipes are manufactured by a manufacturing method where a design of chemical components of materials and/or a process design are changed since no pipes are appropriately manufactured by the existing manufacturing method.

(15) Moreover, according to (1) to (14), being a round-bouse type is set as a condition to be satisfied by the stress-strain curve of the pipe in addition to the strain hardening property.

(16) Moreover, a method for manufacturing a pipe according to the present invention includes a step of controlling a stress-strain curve of a pipe by the method for determining the strain hardening property of the pipe according to (1) to (14); and a step of designing chemical components of materials and/or designing processes on the basis of a condition to be satisfied by the stress-strain curve of the pipe obtained in the step of controlling the stress-strain curve of the pipe.

(17) Moreover, a pipe according to the present invention is manufactured by the method for manufacturing the pipe according to (16).

(18) Moreover, a pipeline according to the present invention is formed by connecting a plurality of pipes corresponding to the pipe according to (17).

According to the present invention, the critical local buckling strain is provided in advance in addition to the pipe diameter and the pipe thickness, and the stress-strain curve of the pipe is controlled such that these conditions are satisfied. Thus, the stress-strain curve control that satisfies both the required economical efficiency and integrity is feasible.

Moreover, the method for manufacturing the pipe satisfying both the required economical efficiency and safety is feasible with the method for determining the strain hardening property of the pipe.

Furthermore, the pipe manufactured by this manufacturing method and the pipeline formed by connecting a plurality of pipes corresponding to this pipe satisfy the required economical efficiency and integrity.

BEST MODE FOR CARRYING OUT THE INVENTION

FIRST EMBODIMENT

Figure 1:
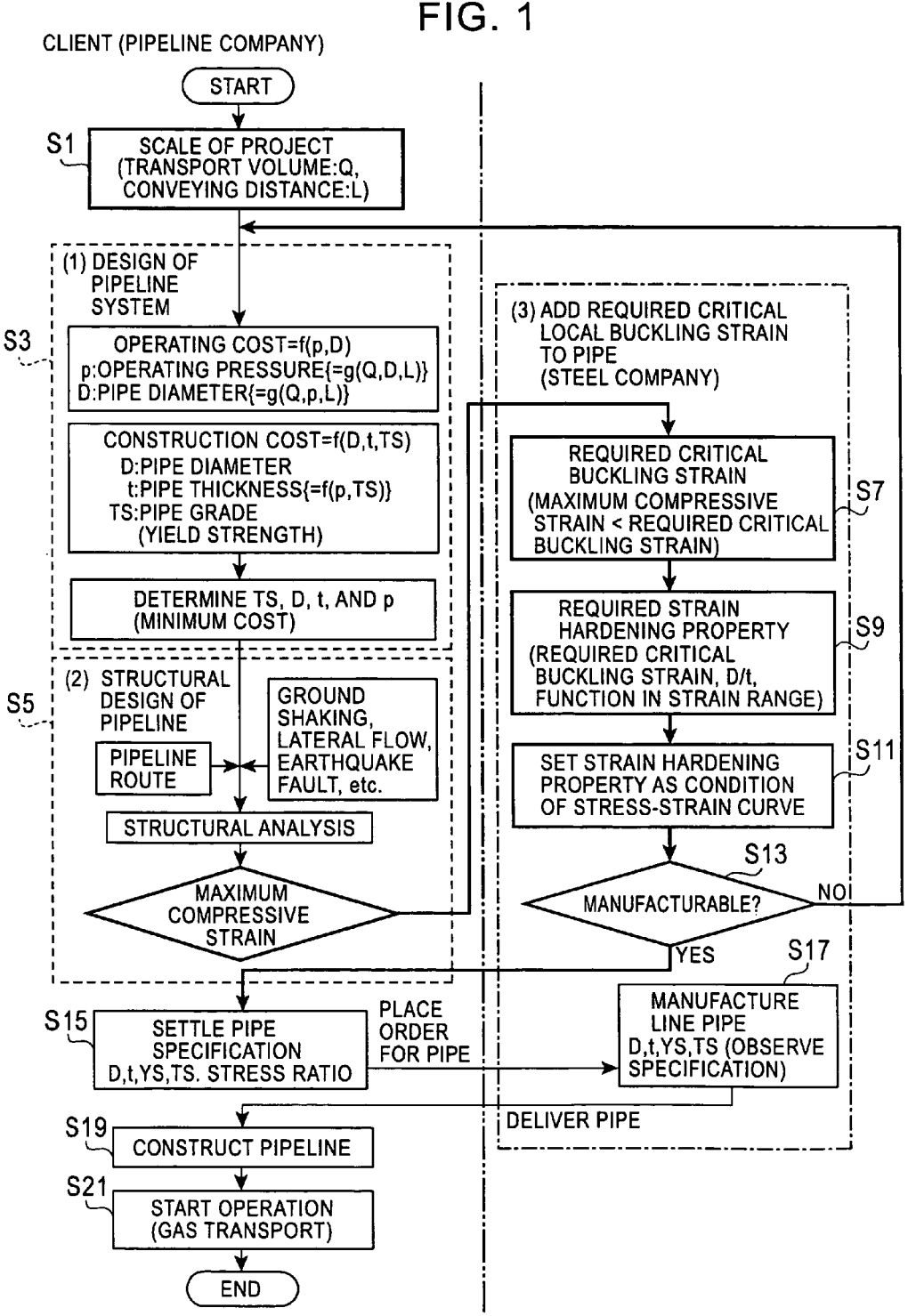
FIG. 1 shows a flow chart illustrating a first embodiment of the present invention.

FIG. 1 presents a flow chart illustrating a method for determining a strain hardening property of a pipe according to a first embodiment of the present invention. As shown in FIG. 1, this embodiment includes a step of defining pipe dimensions where a diameter D, a thickness t, and a transport pressure of a pipe used for a pipeline are temporally set (S3) on the basis of at least transport volume and conveying distance of pressurized fluid transported by the pipeline, the transport volume and the conveying distance being determined according to a project (S1); a step of calculating the maximum axial compressive strain where the structure of the pipeline is designed with consideration of the pipeline route with the pipe having the diameter and the thickness that have been temporally set, and the maximum axial compressive strain generated in the pipe when the transport pressure, ground displacement and/or an external force are exerted on the designed pipeline is determined (S5); a step of defining a required critical local buckling strain for defining the required critical local buckling strain $\epsilon_{req}$ on the basis of the maximum axial compressive strain (S7); a step of acquiring a strain hardening property for acquiring the strain hardening property in the vicinity of a buckling point of the pipe satisfying all the conditions of the diameter D, the thickness t, and the required critical local buckling strain $\epsilon_{req}$ (S9); a step of setting the strain hardening property as a condition to be satisfied by the stress-strain curve of the pipe (S11); and a determination step for determining whether the pipe having the mechanical properties indicated by the stress-strain curve that satisfies a condition can be manufactured when the strain hardening property acquired in the step of acquiring the strain hardening property is set as the condition of the stress-strain curve of the pipe to be satisfied (S13).

The steps will now be described in detail.

Step of Defining the Pipe Dimensions

On the premise of the transport volume and the conveying distance of the pressurized fluid transported by the pipeline, the diameter D, the thickness t, and the transport pressure of the pipe are temporally set such that the operating cost and the construction cost are minimized.

The operating cost is a function of an operating pressure P and the diameter D. Moreover, the operating pressure is a function of a transport volume Q, the diameter D, and a conveying distance L. Furthermore, the diameter D is a function of the transport volume Q, the operating pressure P, and the conveying distance L. The construction cost is a function of the diameter D, the thickness t, and a material grade (yield strength) YS; and the thickness t is a function of the operating pressure P and the material grade TS. Accordingly, the diameter D, the thickness t, and the transport pressure need to be determined by adjusting parameters that are related to each other such that the costs are minimized.

In this embodiment, the parameters are temporally set as follows: the external diameter D=610.0 mm, the pipe thickness t=12.2 mm, the material grade YS: API 5L X80, and a designed internal pressure=10 MPa. According to API 5L X80, a standardized minimum yield point (YSmin) is 551 MPa, and an allowable range of a tensile strength is from TSmin=620 MPa to TSmax=827 MPa.

Step of Calculating the Maximum Axial Compressive Strain

Figure 2:
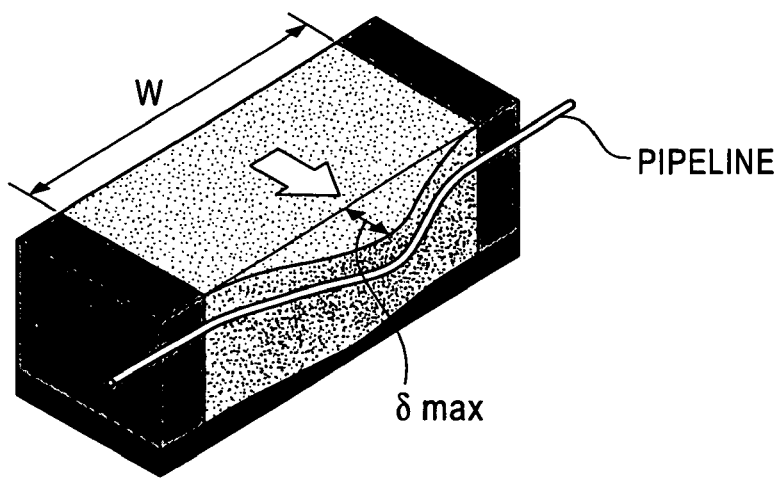
FIG. 2 illustrates a distribution of a lateral flow of the ground in the first embodiment of the present invention.

In this embodiment, a strain hardening property for avoiding local buckling by bending resulting from a lateral flow of the ground is determined as an example. FIG. 2 illustrates a displacement distribution of the ground to be considered when a lateral flow occurs. A general concept of a buried pipeline deformed by the lateral flow is also shown in the drawing. The displacement distribution of the ground caused by the lateral flow can be expressed in terms of a width W and the maximum displacement $\delta_{max}$ of the lateral flow. In a practical anti-seismic design, the width W of liquefaction is difficult to estimate. Therefore, the width W is treated as a variable herein, and the required strain hardening property is determined after the width W at a time when the maximum bending strain is generated in the pipeline is calculated. In this trial calculation, the maximum displacement $\delta_{max}$ is assumed to be 2.0 m.

On the basis of the conditions of the diameter D, the thickness t, the material grade TS, and the operating pressure P that have been temporally set in the step of defining the pipe dimensions, the pipeline shown in FIG. 2 is modeled with shell elements, and the maximum bending strain in compression and the maximum bending strain in tension are calculated by a finite element analysis program. The soil spring characteristics are set on the basis of "Guidelines for Anti-Seismic Design of Gas Pipelines in Liquefaction Region (2003)" Moreover, in this phase, the stress-strain curve of the material is temporally set such that the standardized minimum yield stress (SMYS) and the standardized minimum proof stress (SMTS) defined by the API standard are satisfied.

Figure 3:
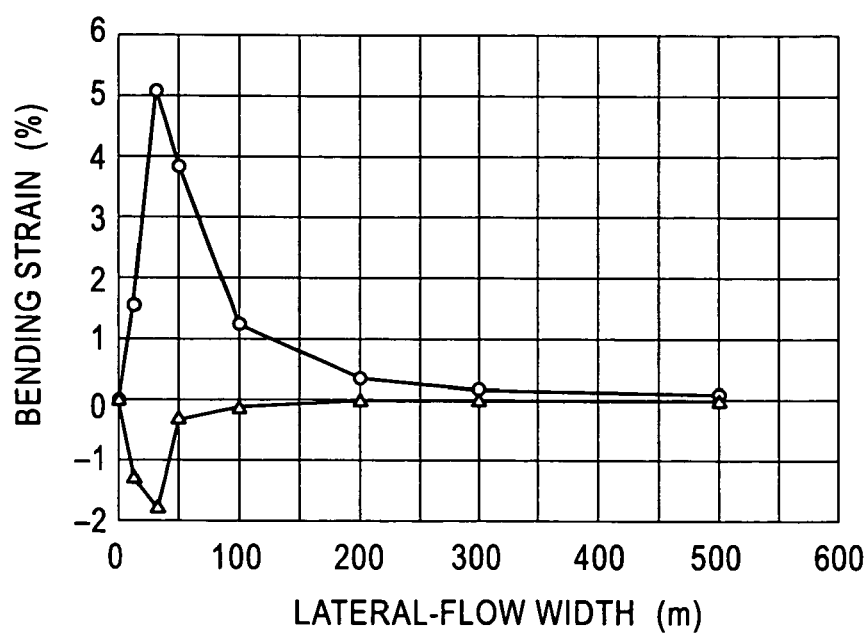
FIG. 3 presents a graph illustrating results of a finite element analysis according to the first embodiment of the present invention.
Figure 7:
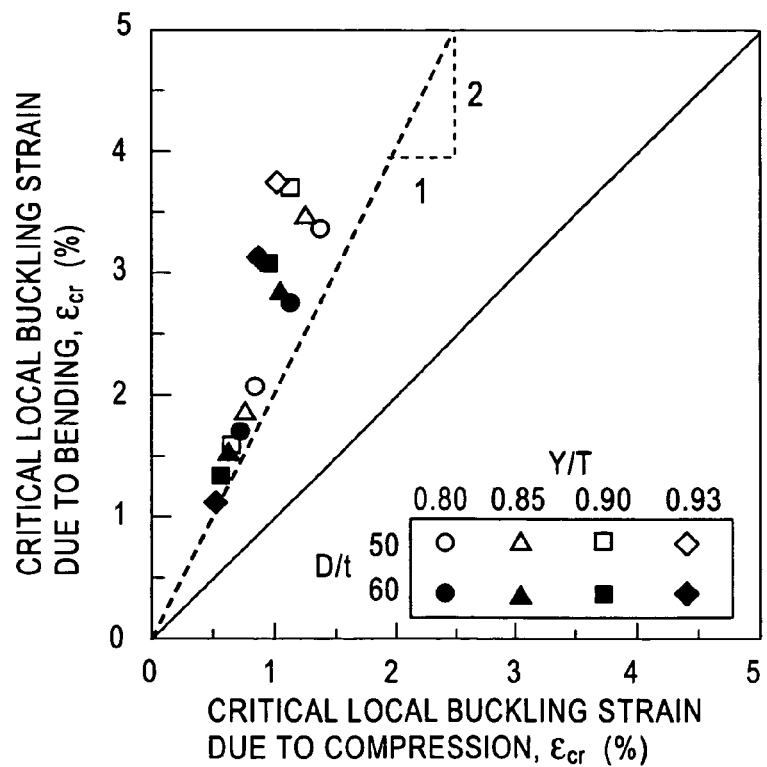
FIG. 7 illustrates the relationship between critical local buckling strain by compression and critical local buckling strain by bending.
Figure 8:
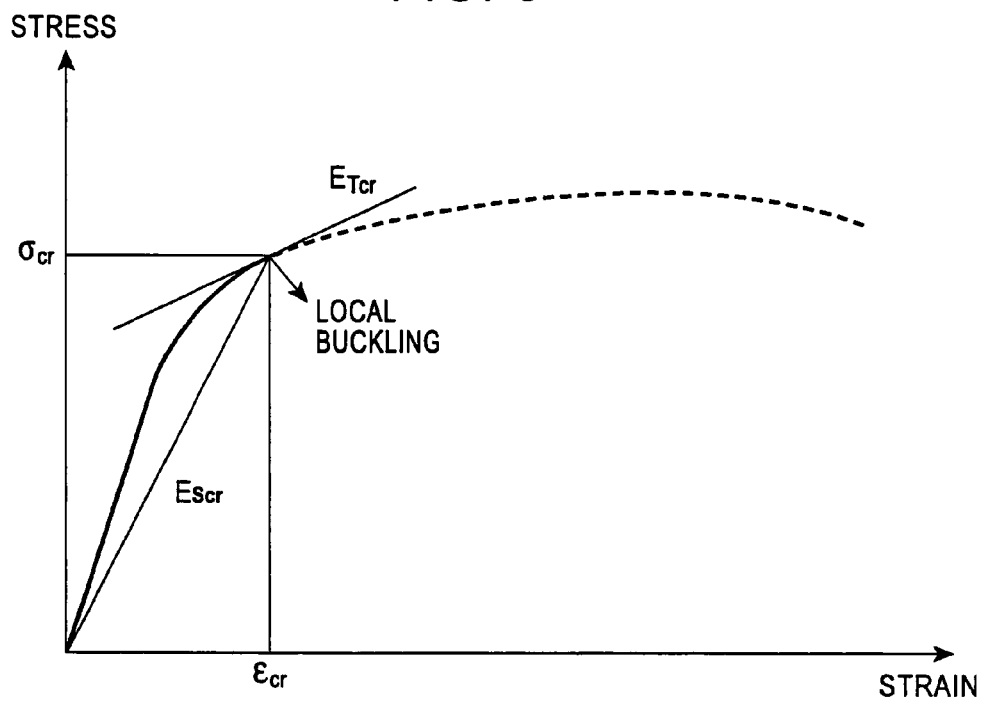
FIG. 8 illustrates the concept of local buckling on a stress-strain curve of a round-bouse type.
Figure 9:
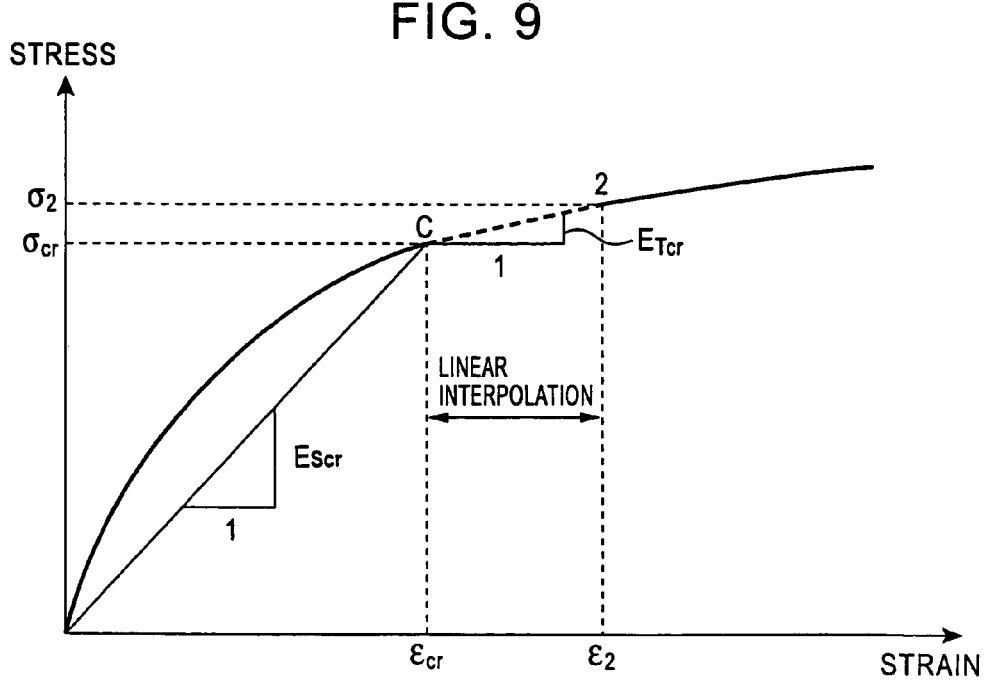
FIG. 9 illustrates a relationship of stress between multiple points on stress-strain coordinates according to the present invention (No. 1).
Figure 10:
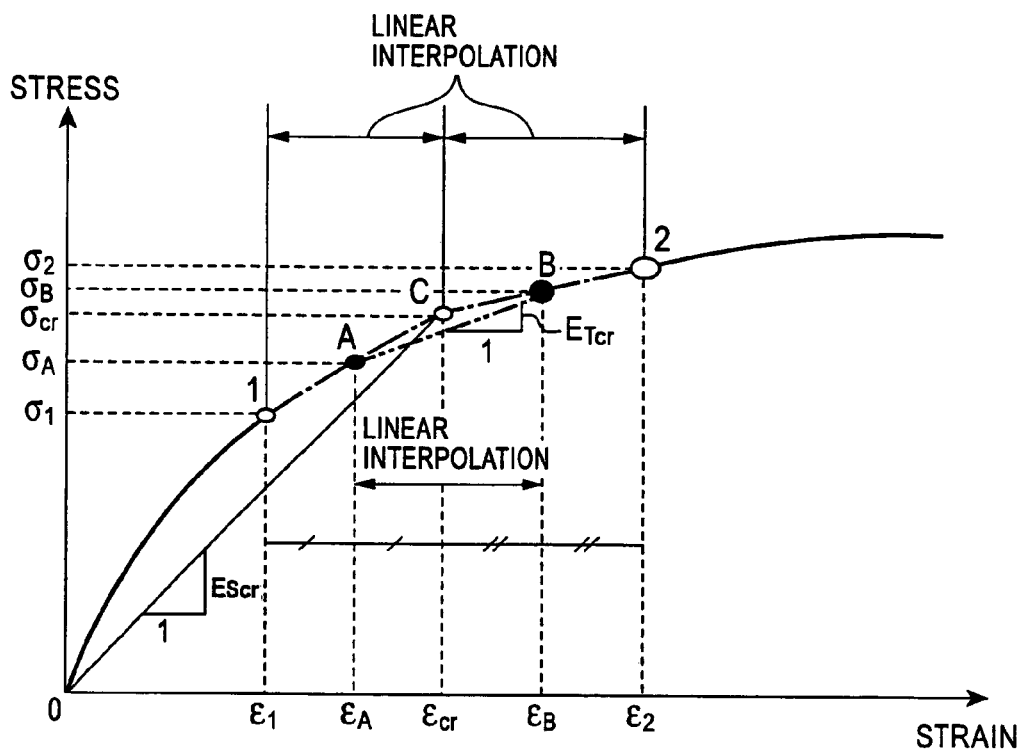
FIG. 10 illustrates a relationship of stress between multiple points on the stress-strain coordinates according to the present invention (No. 2).
Figure 11:
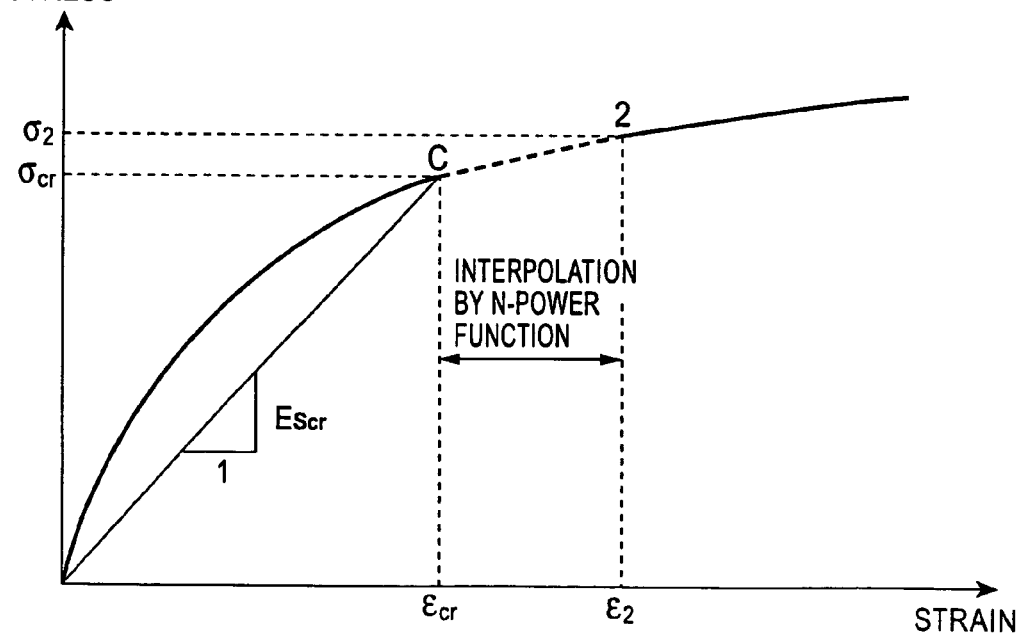
FIG. 11 illustrates a relationship of stress between multiple points on the stress-strain coordinates according to the present invention (No. 3).
Figure 12:
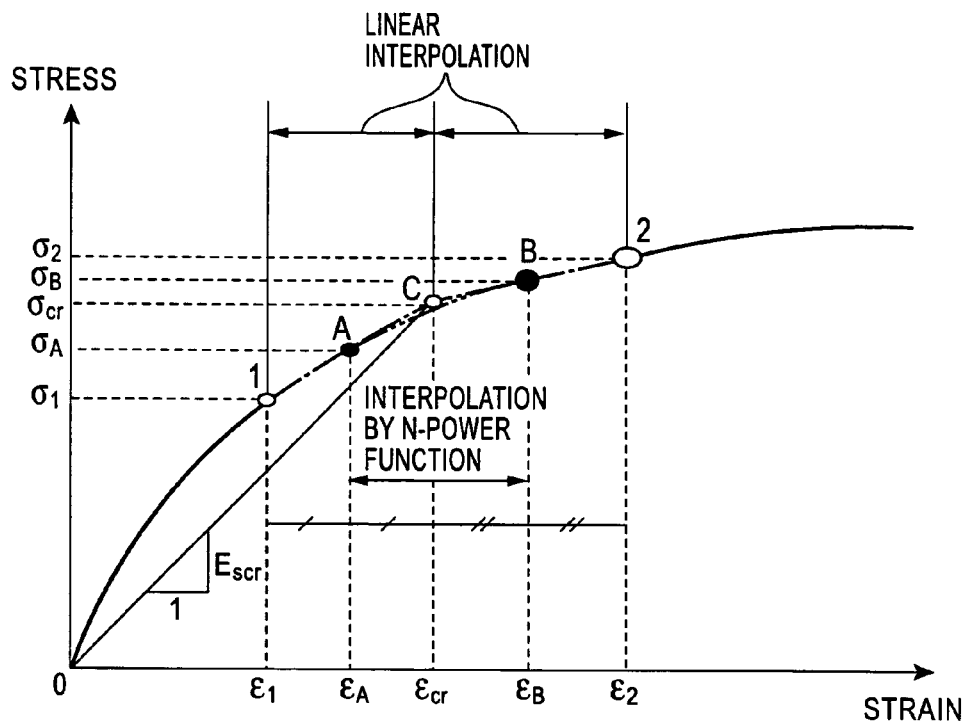
FIG. 12 illustrates a relationship of stress between multiple points on the stress-strain coordinates according to the present invention (No. 4).
Figure 14:
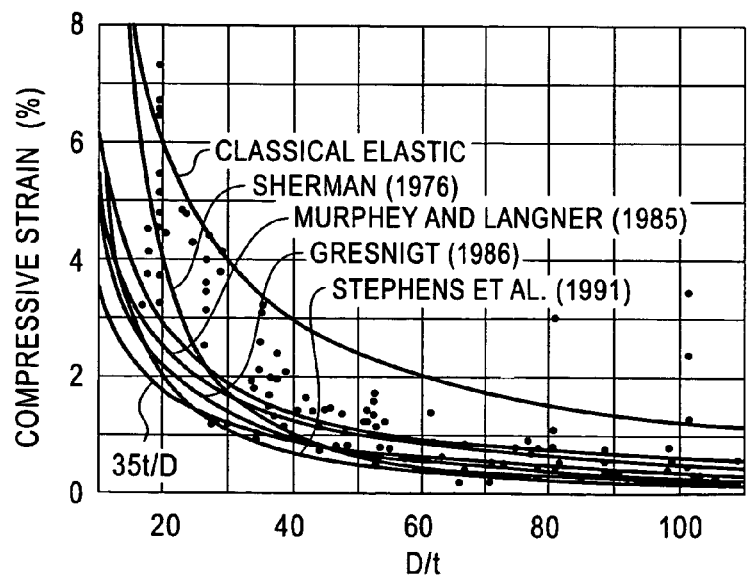
FIG. 14 illustrates relationships between experimental data and design equations relating to the critical local buckling strain.
Figure 13:
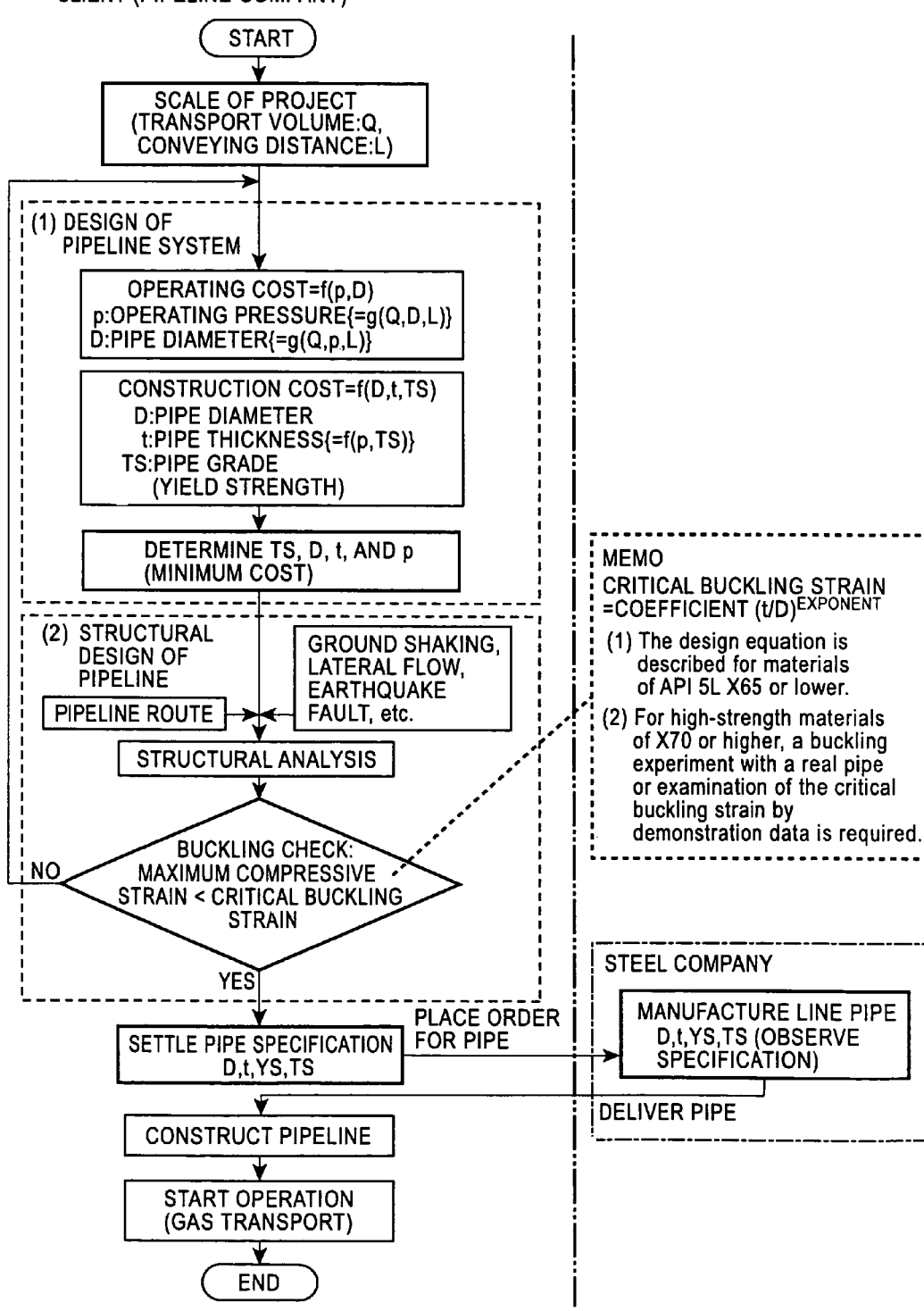
FIG. 13 presents a flow chart illustrating a flow of the process for constructing a general gas pipeline (No. 1).
Figure 15:
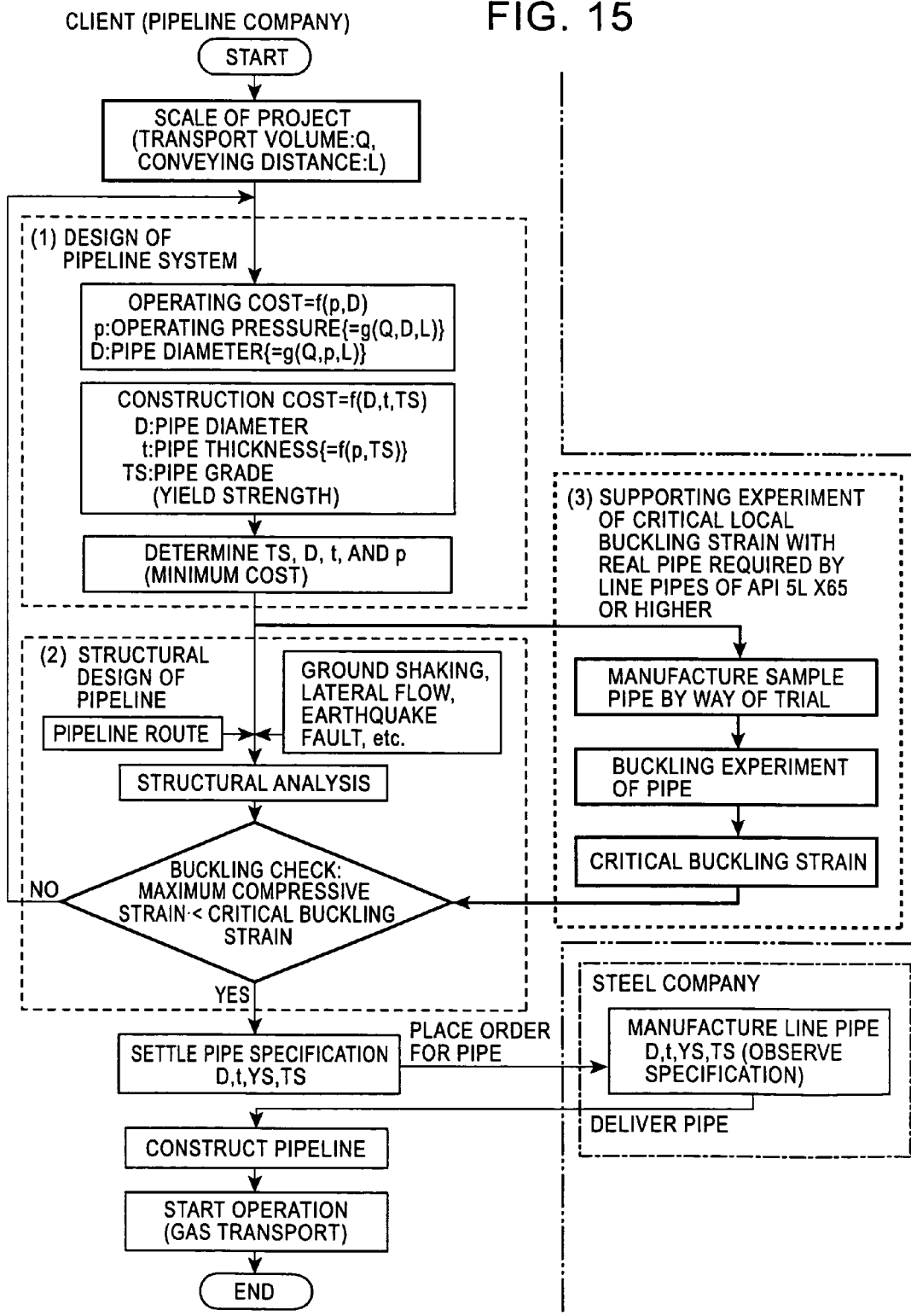
FIG. 15 presents a flow chart illustrating a flow of the process for constructing a general gas pipeline (No. 2).

FIG. 3 illustrates the maximum bending strain in compression (positive sign) and the maximum bending strain in tension (negative sign) of the pipeline from among calculation results of the finite element analysis program. As shown in FIG. 3, the maximum bending strain generated in the pipeline peaks at the lateral-flow width W of 30 m. The maximum bending strain in compression, which is an important parameter for examining the local buckling, also peaks at the width W of 30 m; and the value is approximately 2%. Due to a quantitative relationship between the critical local buckling strain due to bending and the critical local buckling strain due to compression where there is a 2:1 correspondence between the critical local buckling strain due to bending and the critical local buckling strain due to compression (see FIG. 7), the maximum axial compressive strain in this case is approximately 1%.

Step of Defining the Required Critical Local Buckling Strain

After the calculation of the maximum axial compressive strain, the required critical local buckling strain is determined. The required critical buckling strain is determined so as to be larger than or equal to the maximum axial compressive strain by taking a predetermined safety factor into consideration. In this embodiment, the required critical buckling strain is defined as 1% which is substantially equal to the maximum axial compressive strain (S7).

Step of Acquiring the Strain Hardening Property

In this embodiment, in order to acquire the strain hardening property, it is hypothesized that a tentative buckling point corresponding to the required critical local buckling strain $\epsilon_{req}$ is disposed on the stress-strain coordinates and an auxiliary point is disposed at a position on the stress-strain coordinates, the strain value of the auxiliary point being remote from that of the tentative buckling point, and the partial relationship of stress between the multiple points is given by means of the tentative buckling point and the auxiliary point. Specifically, the strain hardening property is given on the basis of the following Equation (2.1).

$$H = \frac{\sigma_2}{\sigma_{req}} \geq 1 + \frac{9}{16}\varepsilon_{req}(\varepsilon_2 - \varepsilon_{req})\left(\frac{D}{t}\right)^2 \qquad (2.1)$$

Substituting $\epsilon_{req}$: 0.010, $\epsilon_2$: 0.015 (an auxiliary point 2 is set at 1.5% by adding 0.5% to the required critical buckling strain of 1.0%), t: 12.2 mm, and D: 610.0 mm into the right side of the above-described equation yields the following:

$$H = \frac{\sigma_2}{\sigma_{req}} \geq 1 + \frac{9}{16}0.010(0.015 - 0.010)\left(\frac{610.0}{12.2}\right)^2 = 1.07$$

Step of Setting the Strain Hardening Property as a Condition to be Satisfied by the Stress-Strain Curve of the Pipe Since the strain hardening property $H=\sigma_2/\sigma_{req}$ is larger than or equal to 1.07, the critical local buckling strain of the pipe having the outside diameter of 610.0 mm and the thickness of 12.2 mm is larger than or equal to 1% as long as the ratio of the stress at 1% strain to the stress at 1.5% strain is larger than or equal to 1.07 on the stress-strain curve.

Determination Step

Figure 4:
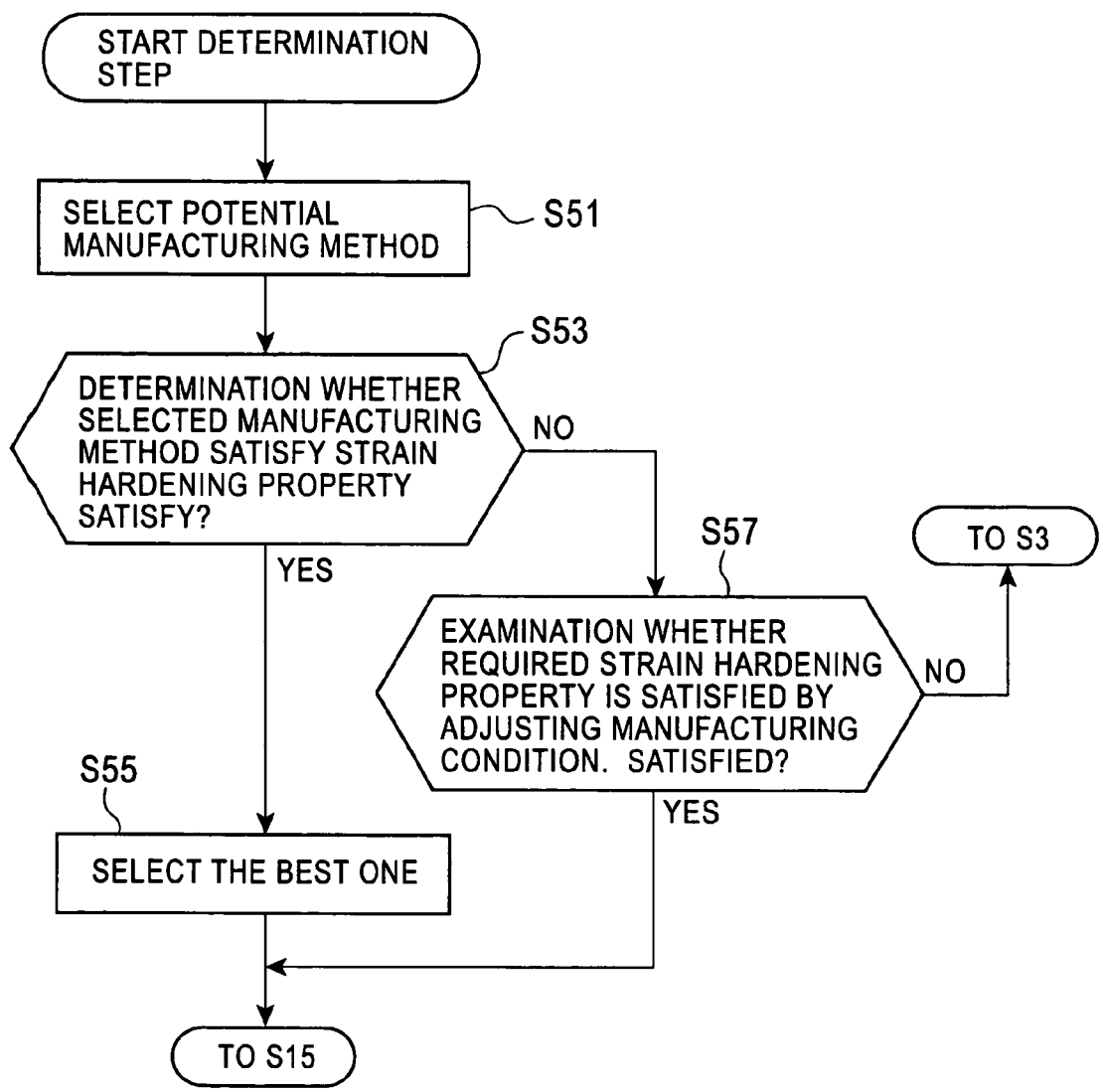
FIG. 4 presents a flow chart illustrating the process of a determination step in the first embodiment of the present invention.

FIG. 4 is a flow chart illustrating the process of the determination step. The determination step will now be described with reference to FIG. 4. The material grade set in the step of defining the pipe dimensions (S3) is API 5L X80. The pipe to be manufactured needs to satisfy the strain hardening property H that is larger than or equal to 1.07, while satisfying the standardized minimum yield stress (YSmin) of 551 MPa, and the allowable range of the tensile strength from TSmin=620 MPa to TSmax=827 MPa according to the material grade of API 5L X80. At this time, potential manufacturing methods A, B, C, D, E, and F are selected on the basis of the conventional production performance (S51), a stress $\sigma_{1.0\%}$ corresponding to the required critical buckling strain $\epsilon_{req}$ (1.0%) and a stress $\sigma_{1.5\%}$ corresponding to the strain (1.5%) are read out from each of the stress-strain curves, and corresponding $H_{(1.0-1.5)}$ is calculated. The values of $H_{(1.0-1.5)}$ calculated for the various manufacturing methods at this time are shown in Table 2.

TABLE 2

Determination of feasibility of manufacture on the basis of production performance of grade X80

| Manufacturing method (Production performance) | $\sigma_{1.0\%}$ (MPa) | $\sigma_{1.5\%}$ (MPa) | $H_{(1.0-1.5)}$ | Determination |
|---|---|---|---|---|
| A | 602 | 620 | 1.03 | Unacceptable |
| B | 769 | 800 | 1.04 | Unacceptable |
| C | 640 | 730 | 1.14 | Acceptable |
| D | 681 | 715 | 1.05 | Unacceptable |

TABLE 2-continued

Determination of feasibility of manufacture on the basis of production performance of grade X80

| Manufacturing method (Production performance) | $\sigma_{1.0\%}$ (Mpa) | $\sigma_{1.5\%}$ (MPa) | $H_{(1.0-1.5)}$ | Determination |
|---|---|---|---|---|
| E | 633 | 690 | 1.09 | Acceptable |
| F | 590 | 625 | 1.06 | Unacceptable |
| Allowable value | YSmin 551 | TS 611-827 | $H_{req} \geqq$ 1.07 | |

On the basis of Table 2, it is determined whether there is a manufacturing method having the value of the acquired $H_{(1.0-1.5)}$ larger than the strain hardening property H or not (S53). When such a manufacturing method is found, the manufacturing method is selected such that the critical local buckling strain of the pipe having the external diameter of 610.0 mm and the pipe thickness of 12.2 mm is larger than or equal to 1%. As shown in Table 2, the manufacturing methods A, B, D, and F are unacceptable, and the manufacturing methods C and E are acceptable in this embodiment. When multiple manufacturing methods are selectable as in this case, the most appropriate manufacturing method, for example, a method that can improve stability of manufacturing, reduce manufacturing costs, or improve buckling-resistant performance can be selected. In this case, the method C with a higher value of H is selected such that the critical local buckling strain becomes larger (S55), and the process proceeds to S15 shown in FIG. 1. According to the manufacturing method C selected at this time, a pipe that satisfies the required critical local buckling strain required against the lateral flow can be obtained, and the pipe satisfies safety requirements. Besides, the thickness t at this time is determined in the step of defining the pipe dimensions with consideration of the costs, and thus the pipe is economically efficient.

In the determination in S53, when the values of $H_{(1.0-1.5)}$ of all the existing manufacturing methods are smaller than the strain hardening property H, it is examined whether the required strain hardening property H can be satisfied by adjusting the manufacturing conditions (rolling temperature, cooling temperature), the chemical components, or the like on the basis of the existing manufacturing method that seems to be most appropriate (S57). When the value of $H_{(1.0-1.5)}$ can be increased compared with the above-described required strain hardening property H by adjusting the manufacturing conditions or the like, the manufacturing method is selected, and the process proceeds to S15 shown in FIG. 1.

As examples of the adjustment of the manufacturing conditions in S57, changes in a temperature at the start of cooling and/or cooling speed after hot-rolling, and moreover in a temperature at the stop of cooling lead to changes in the structure of a hard phase or a hard-phase fraction since steel, which does not have a yield plateau and has a large critical local buckling strain, has a two-phase structure composed of ferrite and the hard phase (bainite, martensite, or the like). In this manner, the strain hardening property can be changed. Furthermore, examples of the adjustment of the chemical components include changing the structure of the hard phase or the hard-phase fraction by changing the content of carbon (C) or manganese (Mn).

When the existing manufacturing method does not satisfy the condition of the strain hardening property H and the condition of the strain hardening property H is not satisfied even when the manufacturing conditions or the chemical components are adjusted, the manufacturing method is determined to be unacceptable. The process then returns to the step of defining the pipe dimensions (S3) such that the characteristics of the pipe are reset, and the processes are repeated in the same manner.

When the manufacturing method is determined to be acceptable in the determination step (S13), the selected manufacturing method and the characteristics of the pipe are presented to the orderer so as to be confirmed (S15). When the orderer confirms and agrees on the characteristics and the like of the pipe, the orderer places an order with the manufacturer. The manufacturer that has received the order manufactures the pipe while observing the confirmed manufacturing method (S17). The manufactured pipe is delivered to the orderer, and the pipeline is constructed (S19). After the construction, the operation is started (S21).

SECOND EMBODIMENT

This embodiment relates to a method for determining a strain hardening property for avoiding local buckling resulting from a lateral fault. Since the flow of processes in this embodiment is basically the same as that in the first embodiment, duplicated parts are described in brief, and different parts are described in detail.

Step of Defining the Pipe Dimensions

As in the first embodiment, on the premise of the transport volume and the conveying distance of the pressurized fluid transported by the pipeline, the diameter D, the thickness t, and the transport pressure of the pipe are temporally set such that the operating cost and the construction cost are minimized.

The characteristics of the pipe temporally set in this embodiment are the same as those set in the first embodiment: the outside diameter D=610.0 mm, the pipe thickness t=12.2 mm, the material grade TS: API 5L X80, and the designed internal pressure=10 MPa. According to API 5L X80, a standardized minimum yield stress (YSmin) is 551 MPa, and an allowable range of a tensile strength is from TSmin=620 MPa to TSmax=827 MPa.

Step of Calculating the Maximum Axial Compressive Strain

Figure 5:
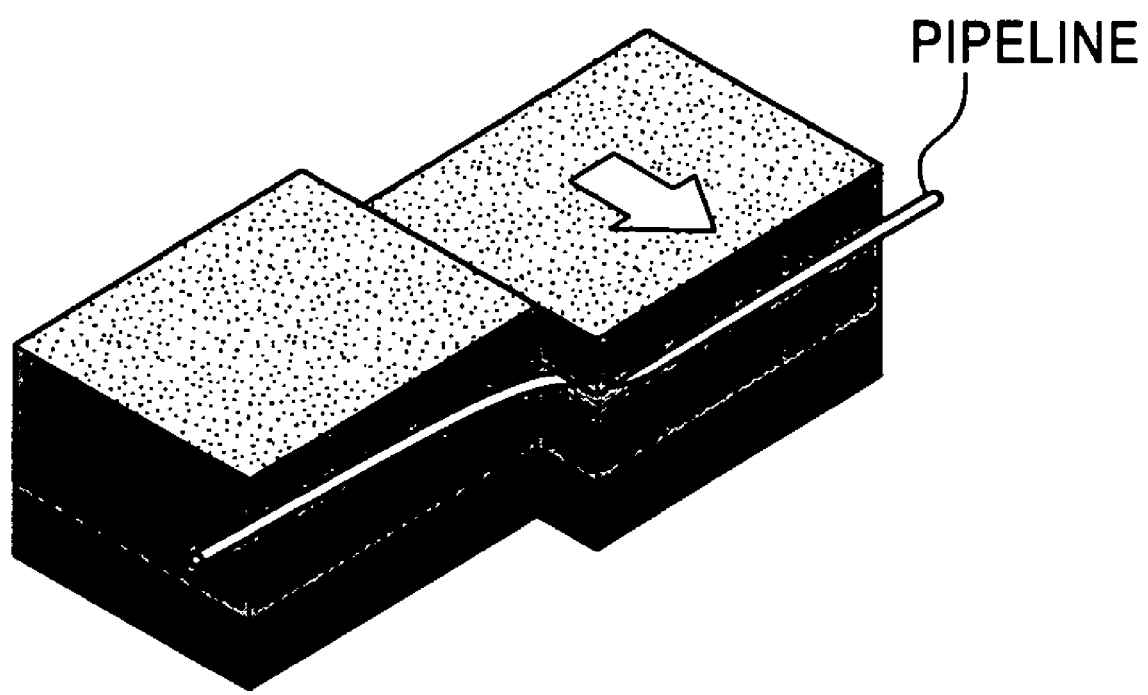
FIG. 5 illustrates a lateral fault of the ground in a second embodiment of the present invention.

This embodiment relates to a lateral fault. FIG. 5 illustrates a general concept of a buried pipeline deformed by a lateral fault. In this trial calculation example, the maximum displacement $\delta_{max}$ is 2.0 m as in the first embodiment, and the spring characteristic of the ground is also set as in the first embodiment.

Figure 6:
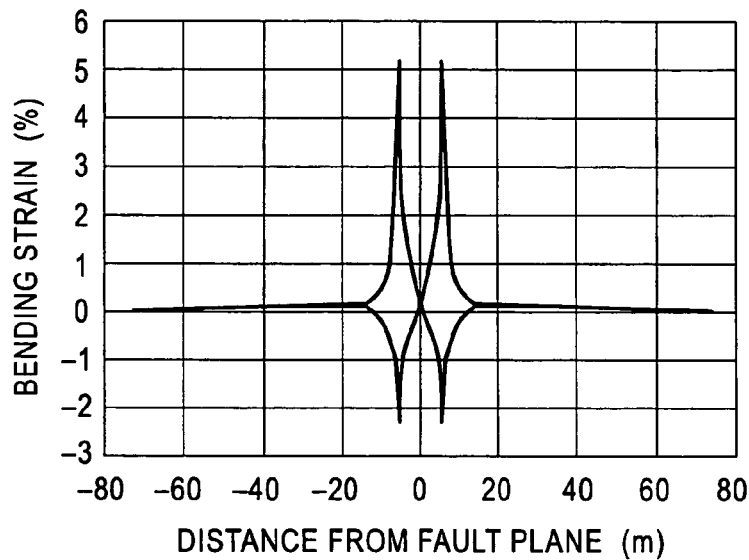
FIG. 6 presents a graph illustrating results of a finite element analysis according to the second embodiment of the present invention.

FIG. 6 illustrates the maximum bending strain by compression (positive sign) and the maximum bending strain by tension (negative sign) of the pipeline from among calculation results of the finite element analysis program. As shown in FIG. 6, the maximum bending strain generated in the pipeline peaks at positions remote from the fault plane by approximately 5 m. The maximum bending strain in compression, which is an important parameter for examining the local buckling is approximately 2.4%. Due to a quantitative relationship between the critical local buckling strain by bending and the critical local buckling strain due to compression where there is a 2:1 correspondence between the critical local buckling strain due to bending and the critical local buckling strain due to compression, the maximum axial compressive strain in this case is approximately 1.2%.

Step of Defining the Required Critical Local Buckling Strain

After the calculation of the maximum axial compressive strain, the required critical local buckling strain is determined. In this embodiment, the required critical buckling strain $\epsilon_{req}$ is defined as 1.5% with consideration of a safety factor of 1.25.

Step of Acquiring the Strain Hardening Property

Also in this embodiment, the strain hardening property is acquired on the basis of Equation (2.1) as in the first embodiment. The auxiliary point is also set at 2.0% by adding 0.5 to the required critical local buckling strain (1.5%) as in the first embodiment. Substitution of required values into Equation (2.1) leads to the following:

$$H = \frac{\sigma_2}{\sigma_{req}} \geq 1 + \frac{9}{16}\varepsilon_{req}(\varepsilon_2 - \varepsilon_{req})\left(\frac{D}{t}\right)^2$$
$$= 1 + \frac{9}{16}0.015(0.020 - 0.015)\left(\frac{610.0}{12.2}\right)^2$$
$$= 1.11$$

Step of Setting the Strain Hardening Property as a Condition to be Satisfied by the Stress-Strain Curve of the Pipe Since the strain hardening property $H=\sigma_2/\sigma_{req}$ is larger than or equal to 1.11, the critical local buckling strain of the pipe having the outside diameter of 610.0 mm and the thickness of 12.2 mm is larger than or equal to 1.5% as long as the ratio of the stress at 1.5% strain to the stress at 2.0% strain is larger than or equal to 1.11 on the stress-strain curve.

Determination Step

The pipe to be manufactured needs to satisfy the strain hardening property H that is larger than or equal to 1.11, while satisfying the standardized minimum yield stress (YSmin) of 551 MPa, and the allowable range of the tensile strength from TSmin=620 MPa to TSmax=827 MPa according to the material grade of API 5L X80. As in the first embodiment, potential manufacturing methods A, B, C, D, E, and F are selected on the basis of the conventional production performance, a buckling stress $\sigma_{req}$ corresponding to the required critical buckling strain $\epsilon_{req}$ (1.5%) and a stress $\sigma_2$ corresponding to the strain (2.0%) are read out from each of the stress-strain curves, and corresponding $H_{(1.5-2.0)}$ is calculated. The values of $H_{(1.5-2.0)}$ calculated for the various manufacturing methods at this time are shown in Table 3.

TABLE 3

Determination of feasibility of manufacture on the basis of production performance of grade X80

| Manufacturing method (Production performance) | $\sigma_{1.5\%}$ (Mpa) | $\sigma_{2.0\%}$ (MPa) | $H_{(1.5-2.0)}$ | Determination |
|---|---|---|---|---|
| A | 620 | 626 | 1.01 | Unacceptable |
| B | 800 | 816 | 1.02 | Unacceptable |
| C | 730 | 825 | 1.13 | Acceptable |
| D | 715 | 744 | 1.04 | Unacceptable |
| E | 690 | 745 | 1.08 | Unacceptable |
| F | 625 | 656 | 1.05 | Unacceptable |
| Allowable value | YSmin 551 | TS 611-827 | $H_{req} \geq$ 1.11 | |

As shown in Table 3, when there is a manufacturing method having the value of the acquired $H_{(1.5-2.0)}$ larger than the strain hardening property H, the manufacturing method is selected such that the critical local buckling strain of the pipe having the outside diameter of 610.0 mm and the pipe thickness of 12.2 mm is larger than or equal to 1.5%. As shown in Table 3, the manufacturing methods A, B, D, E, and F are unacceptable, and the manufacturing methods C is acceptable. According to this manufacturing method C, a pipe that satisfies the required critical local buckling strain required against the lateral fault can be obtained, and the pipe satisfies safety requirements. Besides, the thickness t at this time is determined in the step of defining the pipe dimensions with consideration of the costs, and thus the pipe is economically efficient.

Subsequent processes are the same as those described in the first embodiment.

As described above, according to the first and second embodiments, the pipe thickness defined in the step of defining the pipe dimensions with consideration of the costs can be adopted without change, and the stress-strain curve control of the pipe having a high economical efficiency while satisfying safety requirements can be realized.

For materials having stress-strain curves of a round-bouse type as described in the first and second embodiments as examples, the required critical local buckling strain can be arbitrarily specified. That is to say, in contrast to materials having stress-strain curves of a plateau type, the required critical local buckling strain of the materials being required to be specified with a value higher than that in the strain hardening range, the required critical local buckling strain of the materials having the stress-strain curves of the round-bouse type can be specified with an arbitrary value without such restrictions. Thus, the stress-strain curve control can be simplified.

Moreover, the concept of the stress-strain curve control as shown in the step of defining the required critical local buckling strain (S7) to the determination step (S13) in FIG. 1, the concept being heretofore unknown to the pipeline company, is presented in this embodiment. As a result, it becomes possible for the pipeline company to request a pipe that enables the construction cost to be more advantageous to the manufacturer, and on the other hand, it also becomes possible for the manufacturer to manufacture a line pipe enabling regulation of the manufacturing cost in a range satisfying the condition given by the pipeline company.

In the examples according to the first and second embodiments described above, the critical local buckling strain due to bending is given as a required condition, and the critical local buckling strain due to bending is converted into the critical local buckling strain by compression with the quantitative relationship between the critical local buckling strain due to bending and the critical local buckling strain due to compression in the step of defining the pipe dimensions. When the critical local buckling strain due to compression is given as the required condition, the processes can be the same as those detailed in the first and second embodiments except that the above-described conversion step is omitted.

Furthermore, in the examples according to the first and second embodiments described above, the strain hardening property is given as the partial relationship of stress between the multiple points. However, the present invention is not limited to these embodiments, and the strain hardening property can also be given as an inclination of a tangential line of a stress-strain curve at a tentative buckling point when the virtual buckling point corresponding to the required critical local buckling strain $\epsilon_{req}$ is supposed to be on the stress-strain coordinates.

Moreover, in the examples according to the first and second embodiments described above, the material grade (material standard) is used as the condition to be satisfied by the pipe in the step of defining the pipe dimensions. However, the present invention is not limited to these embodiments, and the required conditions (ranges of YS and TS, and the like) of the pipeline company and the like can be used as the conditions to be satisfied by the pipe in the step of defining the pipe dimensions.

Furthermore, in the examples according to the first and second embodiments described above, the pipeline company carries out the step of defining the pipe dimensions (S1 and S3) on the basis of the transport volume and the conveying distance and the step of calculating the maximum axial compressive strain (S5), and the steel company carries out the step of defining the required critical local buckling strain (S7) to the determination step (S13) as shown in the flow chart in FIG. 1. However, the step of defining the pipe dimensions (S1 and S3) on the basis of the transport volume and the conveying distance and the step of calculating the maximum axial compressive strain (S5) can be carried out by, for example, the steel company or a consulting firm other than the pipeline company. Besides, the step of defining the required critical local buckling strain (S7) to the determination step (S13) can be carried out by, for example, the pipeline company or a consulting firm other than the steel company.

In this manner, the performer of each step shown in the flow chart in FIG. 1 can be selected completely freely depending on a state of business.

The invention claimed is:

1. A method for determining a strain hardening property of a pipe, comprising:
   a step of defining pipe dimensions where a diameter D, a thickness t, and a required critical local buckling strain $\epsilon_{req}$ of the pipe are set as conditions to be satisfied;
   a step of acquiring a strain hardening property for acquiring the strain hardening property in the vicinity of a buckling point of the pipe satisfying the conditions set in the step of defining the pipe dimensions; and
   a step of setting the strain hardening property as a condition to be satisfied by the stress-strain curve of the pipe.

2. A method for determining a strain hardening property of a pipe, comprising:
   a step of defining pipe dimensions where a diameter D, a thickness t, and a transport pressure of the pipe used for a pipeline are temporally set on the basis of at least transport volume and conveying distance of pressurized fluid transported by the pipeline;
   a step of calculating the maximum axial compressive strain where the structure of the pipeline is designed with consideration of the pipeline route with the pipe having the diameter and the thickness that have been temporally set, and where the maximum axial compressive strain generated in the pipe when the transport pressure, ground displacement and/or an external force are exerted on the designed pipeline is determined;
   a step of defining a required critical local buckling strain for defining the required critical local buckling strain $\epsilon_{req}$ on the basis of the maximum axial compressive strain;
   a step of acquiring a strain hardening property for acquiring the strain hardening property in the vicinity of a buckling point of the pipe satisfying all the conditions of the diameter D, the thickness t, and the required critical local buckling strain $\epsilon_{req}$; and
   a step of setting the strain hardening property as a condition to be satisfied by the stress-strain curve of the pipe.

3. A method for determining a strain hardening property of a pipe, comprising:
   a step of defining pipe dimensions where a diameter D, a thickness t, and a required critical local buckling strain due to bending of the pipe are set as conditions to be satisfied;
   a step of converting critical local buckling strain where the required critical local buckling strain due to bending is converted into the required critical local buckling strain $\epsilon_{req}$ due to compression with a quantitative relationship between the critical local buckling strain due to bending and the critical local buckling strain due to compression;
   a step of acquiring a strain hardening property for acquiring the strain hardening property in the vicinity of a buckling point of the pipe satisfying all the conditions of the diameter D, the thickness t, and the required critical local buckling strain $\epsilon_{req}$ due to compression; and
   a step of setting the strain hardening property as a condition to be satisfied by the stress-strain curve of the pipe.

4. A method for determining a strain hardening property of a pipe, comprising:
   a step of defining pipe dimensions where a diameter D, a thickness t, and a transport pressure of the pipe used for a pipeline are temporally set on the basis of at least transport volume and conveying distance of pressurized fluid transported by the pipeline;
   a step of calculating the maximum bending strain where the structure of the pipeline is designed with consideration of the pipeline route with the pipe having the diameter and the thickness that have been temporally set, and where the maximum bending strain generated in the pipe when the transport pressure, ground displacement and/or an external force are exerted on the pipeline is determined;
   a step of converting critical local buckling strain where a required critical local buckling strain due to bending is set on the basis of the maximum bending strain, and then the required critical local buckling strain due to bending is converted into a required critical local buckling strain $\epsilon_{req}$ due to compression with a quantitative relationship between the critical local buckling strain due to bending and the critical local buckling strain due to compression;
   a step of acquiring a strain hardening property for acquiring the strain hardening property in the vicinity of a buckling point of the pipe satisfying all the conditions of the diameter D, the thickness t, and the required critical local buckling strain $\epsilon_{req}$ by compression; and
   a step of setting the strain hardening property as a condition to be satisfied by the stress-strain curve of the pipe.

5. The method for determining the strain hardening property of the pipe according to any one of claims 1 to 4, wherein the strain hardening property is given with respect to the inclination of a tangential line on the stress-strain curve at a tentative buckling point, the tentative buckling point corresponding to the required critical local buckling strain $\epsilon_{req}$ supposed to be on the stress-strain coordinates.

6. The method for determining the strain hardening property of the pipe according to claim 5, wherein the strain hardening property satisfies the following equation when the strain hardening property and the tangential line are defined as H and $E_{Treq}$, respectively:

$$H = \frac{E_{Treq}}{\sigma_{req}} \geq \frac{9}{16} \varepsilon_{req} \left(\frac{D}{t}\right)^2$$

where $\sigma_{req}$ is a stress of a point on the stress-strain curve corresponding to $\epsilon_{req}$.

7. The method for determining the strain hardening property of the pipe according to any one of claims 1 to 4, wherein the strain hardening property is given as a partial relationship of stress between multiple points by means of a tentative buckling point and one or more auxiliary points when it is hypothesized that the tentative buckling point corresponding to the required critical local buckling strain $\epsilon_{req}$ is disposed on the stress-strain coordinates and the one or more auxiliary points are disposed at positions on the stress-strain coordinates, the strain values of the auxiliary points being remote from that of the tentative buckling point.

8. The method for determining the strain hardening property of the pipe according to claim 7, wherein
the partial relationship of stress between the multiple points satisfies the following equation:

$$H = \frac{\sigma_2}{\sigma_{req}} \geq 1 + \frac{9}{16}\varepsilon_{req}(\varepsilon_2 - \varepsilon_{req})\left(\frac{D}{t}\right)^2$$

where
$\varepsilon_{req}$: required critical local buckling strain;
$\sigma_{req}$: stress of a point corresponding to $\varepsilon_{req}$ on the stress-strain curve;
$\varepsilon_2$: strain at an auxiliary point; and
$\sigma_2$: stress of a point corresponding to $\varepsilon_2$ on the stress-strain curve.

9. The method for determining the strain hardening property of the pipe according to claim 7, wherein
the partial relationship of stress between the multiple points satisfies the following equation:

$$H = \frac{2\sigma_{req} + (\sigma_2 - \sigma_1)}{2\sigma_{req}} \geq \left\{1 + \frac{9}{32}(\varepsilon_2 - \varepsilon_1)\varepsilon_{req}\left(\frac{D}{t}\right)^2\right\}$$

where
$\varepsilon_1, \varepsilon_2$: strains at auxiliary points with the buckling point interposed therebetween;
$\sigma_{req}$: stress of a point corresponding to $\varepsilon_{req}$ on the stress-strain curve; and
$\sigma_1, \sigma_2$: stresses of points corresponding to $\varepsilon_1$ and $\varepsilon_2$, respectively, on the stress-strain curve.

10. The method for determining the strain hardening property of the pipe according to claim 7, wherein
the partial relationship of stress between the multiple points satisfies the following equation:

$$H = \frac{\sigma_2}{\sigma_{req}} \geq \left\{1 + \frac{9}{16}\log_e\left(\frac{\varepsilon_2}{\varepsilon_{req}}\right)\varepsilon_{req}^2\left(\frac{D}{t}\right)^2\right\}$$

where
$\varepsilon_2$: strain at an auxiliary point;
$\sigma_{req}$: stress of a point corresponding to $\varepsilon_{req}$ on the stress-strain curve; and
$\sigma_2$: stress of a point corresponding to $\varepsilon_2$ on the stress-strain curve.

11. The method for determining the strain hardening property of the pipe according to claim 7, wherein
the partial relationship of stress between the multiple points satisfies the following equation:

$$H = \frac{\sigma_2 + \sigma_{req}}{\sigma_1 + \sigma_{req}} \geq \left\{1 + \frac{9}{16}\log_e\left(\frac{\varepsilon_2 + \varepsilon_{req}}{\varepsilon_1 + \varepsilon_{req}}\right)\varepsilon_{req}^2\left(\frac{D}{t}\right)^2\right\}$$

where
$\varepsilon_1, \varepsilon_2$: strains at auxiliary points with the buckling point interposed therebetween;
$\sigma_{req}$: stress of a point corresponding to $\varepsilon_{req}$ on the stress-strain curve; and
$\sigma_1, \sigma_2$: stresses of points corresponding to $\varepsilon_1$ and $\varepsilon_2$, respectively, on the stress-strain curve.

12. The method for determining the strain hardening property of the pipe according to any one of claims 1 to 4, wherein
a yield-stress range and a tensile-stress range determined by the standards or the required conditions of materials in addition to the strain hardening property are set as conditions to be satisfied by the stress-strain curve of the pipe.

13. The method for determining the strain hardening property of the pipe according to any one of claims 1 to 4, further comprising:
a determination step for determining whether the pipe having mechanical properties indicated by the stress-strain curve that satisfies a condition can be manufactured when the strain hardening property acquired in the step of acquiring the strain hardening property is set as the condition of the stress-strain curve of the pipe to be satisfied, wherein the pipe diameter and the pipe thickness that are set or temporally set are adopted when it is determined to be manufacturable in the determination step, and the process returns to the step of defining the pipe dimensions and restarts when it is determined to be unmanufacturable.

14. The method for determining the strain hardening property of the pipe according to claims 13, wherein
the determination step comprises a determination when pipes are manufactured by an existing manufacturing method and a determination when pipes are manufactured by a manufacturing method where a design of chemical components of materials and/or a process design are changed since no pipes are appropriately manufactured by the existing manufacturing method.

15. The method for determining the strain hardening property of the pipe according to any one of claims 1 to 4, wherein
being a round-bouse type is set as a condition to be satisfied by the stress-strain curve of the pipe in addition to the strain hardening property.

* * * * *